United States Patent
Nagahara

(10) Patent No.: US 9,739,989 B2
(45) Date of Patent: Aug. 22, 2017

(54) PROJECTION ZOOM LENS AND PROJECTION TYPE DISPLAY DEVICE

(71) Applicant: FUJIFILM Corporation, Tokyo (JP)

(72) Inventor: Akiko Nagahara, Saitama-ken (JP)

(73) Assignee: FUJIFILM Corporation, Tokyo (JP)

(*) Notice: Subject to any disclaimer, the term of this patent is extended or adjusted under 35 U.S.C. 154(b) by 56 days.

(21) Appl. No.: 14/821,009

(22) Filed: Aug. 7, 2015

(65) Prior Publication Data
US 2016/0062093 A1    Mar. 3, 2016

(30) Foreign Application Priority Data
Aug. 29, 2014  (JP) .................... 2014-175044

(51) Int. Cl.
| G02B 15/14 | (2006.01) |
| G02B 15/177 | (2006.01) |
| G02B 27/00 | (2006.01) |
| H04N 9/31 | (2006.01) |

(52) U.S. Cl.
CPC ....... G02B 15/177 (2013.01); G02B 27/0025 (2013.01); H04N 9/317 (2013.01)

(58) Field of Classification Search
CPC ...... G02B 15/20; G02B 15/24; G02B 15/167; H04N 9/3176
USPC ....... 359/641, 649, 676, 680, 686, 691, 659, 359/696, 681, 682, 683
See application file for complete search history.

(56) References Cited

U.S. PATENT DOCUMENTS

| 2008/0106801 A1* | 5/2008 | Kang | G02B 15/177 359/691 |
| 2008/0304162 A1 | 12/2008 | Yamasaki | |
| 2011/0026132 A1* | 2/2011 | Sado | G02B 13/16 359/682 |
| 2011/0109975 A1* | 5/2011 | Amano | G02B 13/22 359/682 |
| 2014/0111850 A1* | 4/2014 | Huang | G02B 13/04 359/357 |

FOREIGN PATENT DOCUMENTS

| JP | 2008-304765 | 12/2008 |
| JP | 5254146 | 8/2013 |
| JP | 5378162 | 12/2013 |

* cited by examiner

*Primary Examiner* — James Greece
*Assistant Examiner* — Travis Fissel
(74) *Attorney, Agent, or Firm* — Young & Thompson

(57) ABSTRACT

A projection zoom lens is essentially constituted by, in order from the magnification side: a negative first lens group, which is fixed when changing magnification; a positive second lens group, which moves when changing magnification; a plurality of other lens groups; and a final lens group, which is fixed when changing magnification. The distances among all adjacent lens groups change when changing magnification. The first through third lenses from the magnification side within the first lens group are a first single lens having an aspherical surface with a concave surface toward the magnification side and a negative refractive power in the paraxial region, a second single lens having an aspherical surface, and a third lens. A first lens group front group constituted by the first through third lenses has a negative refractive power. Predetermined conditional formulae are satisfied.

14 Claims, 17 Drawing Sheets

FIG.2
EXAMPLE 2
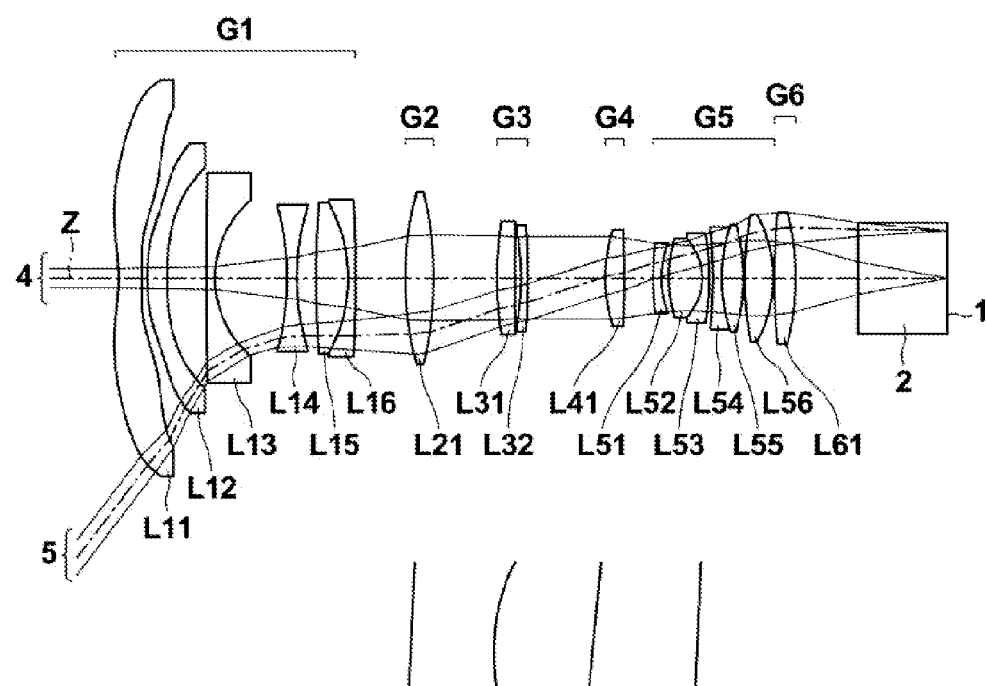
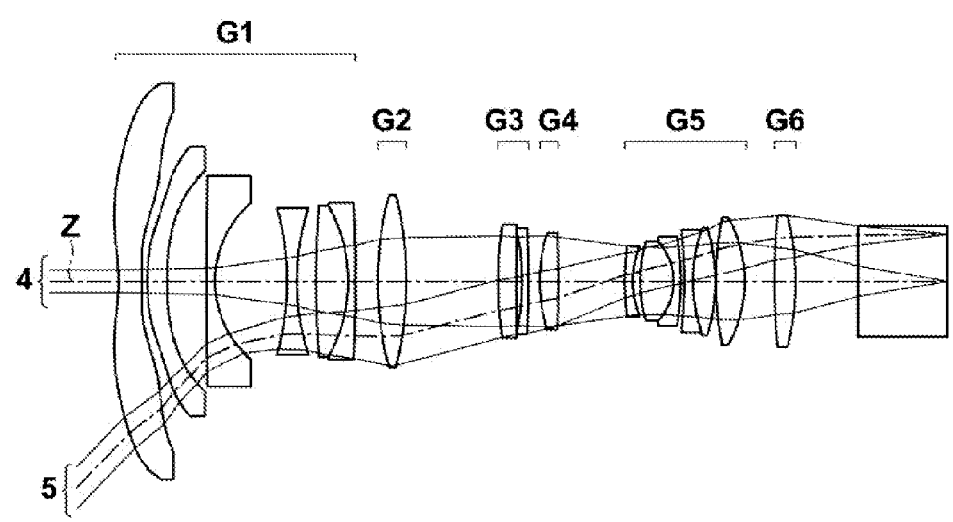

FIG.3
EXAMPLE 3
WIDE
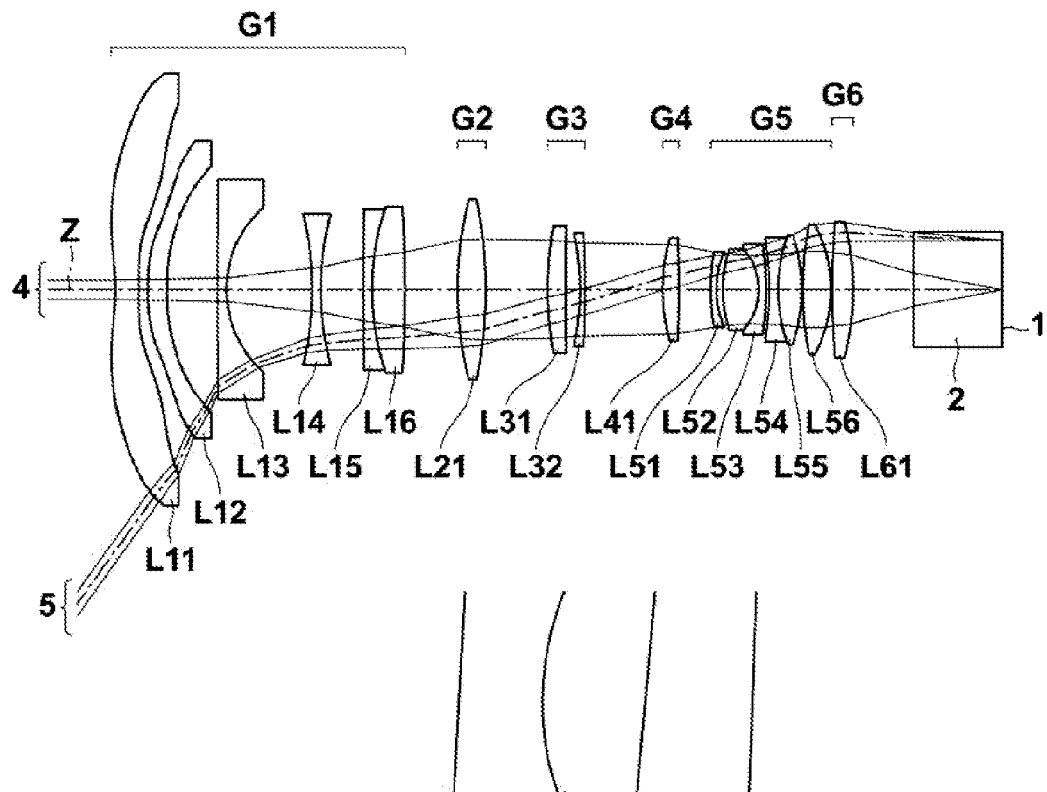
TELE
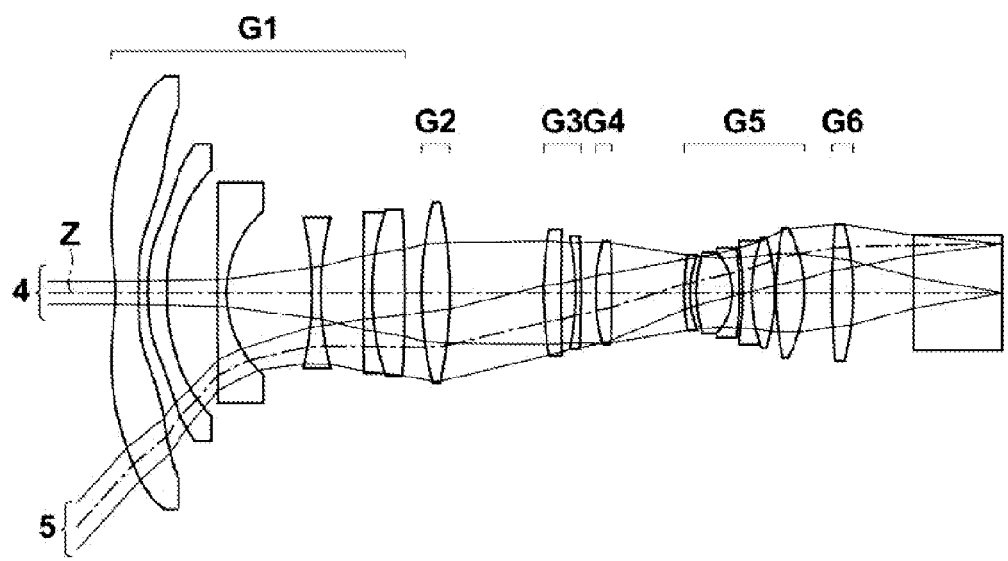

FIG.4
EXAMPLE 4
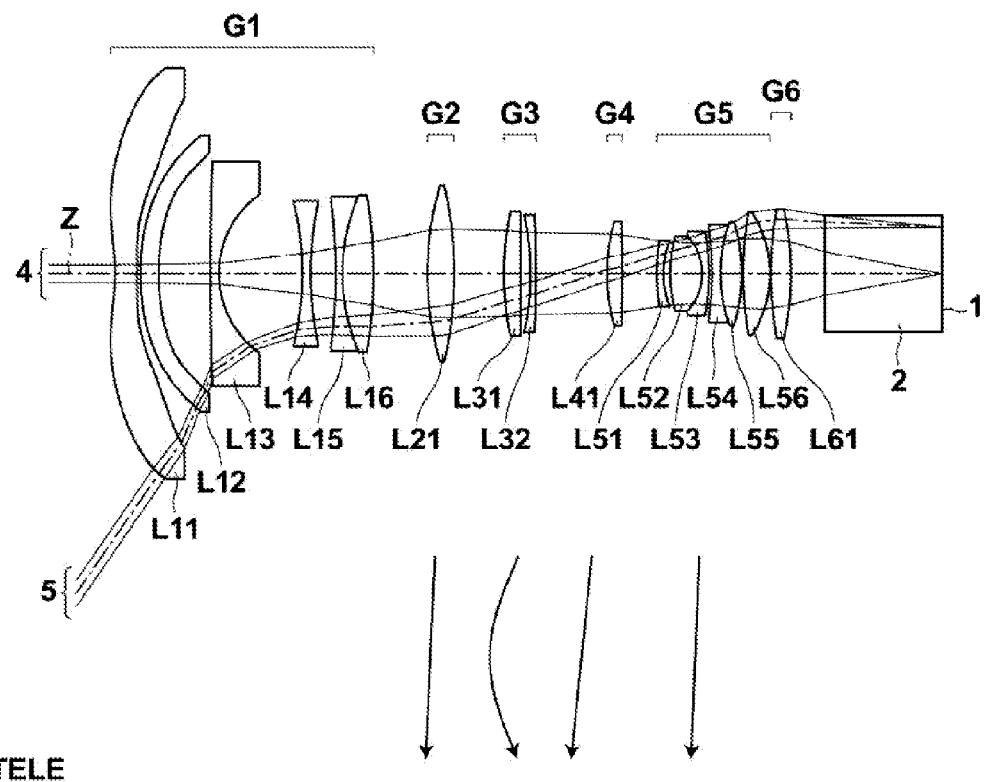
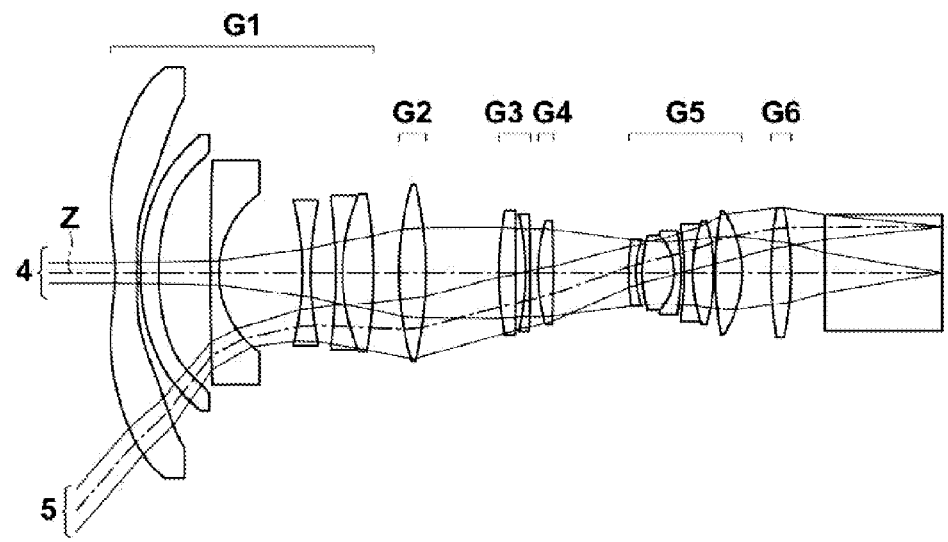

FIG.5
EXAMPLE 5
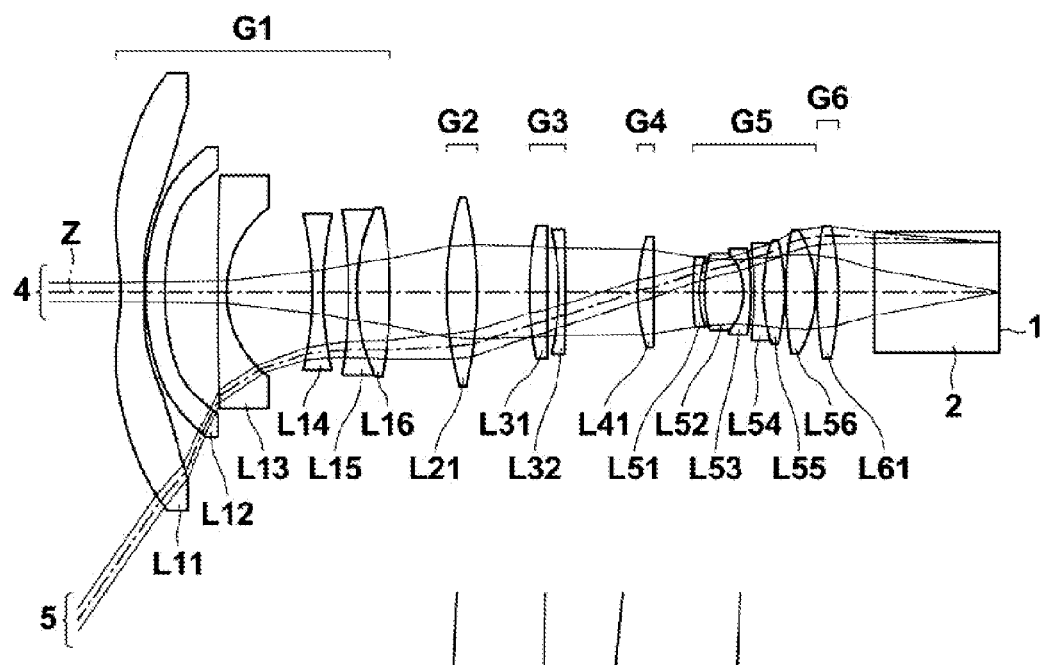
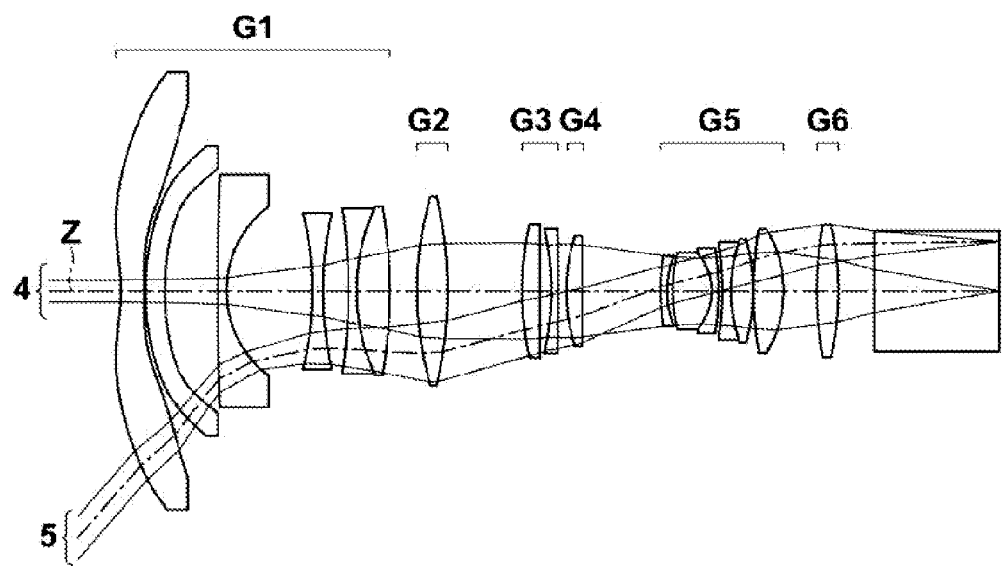

FIG.6
EXAMPLE 6
WIDE
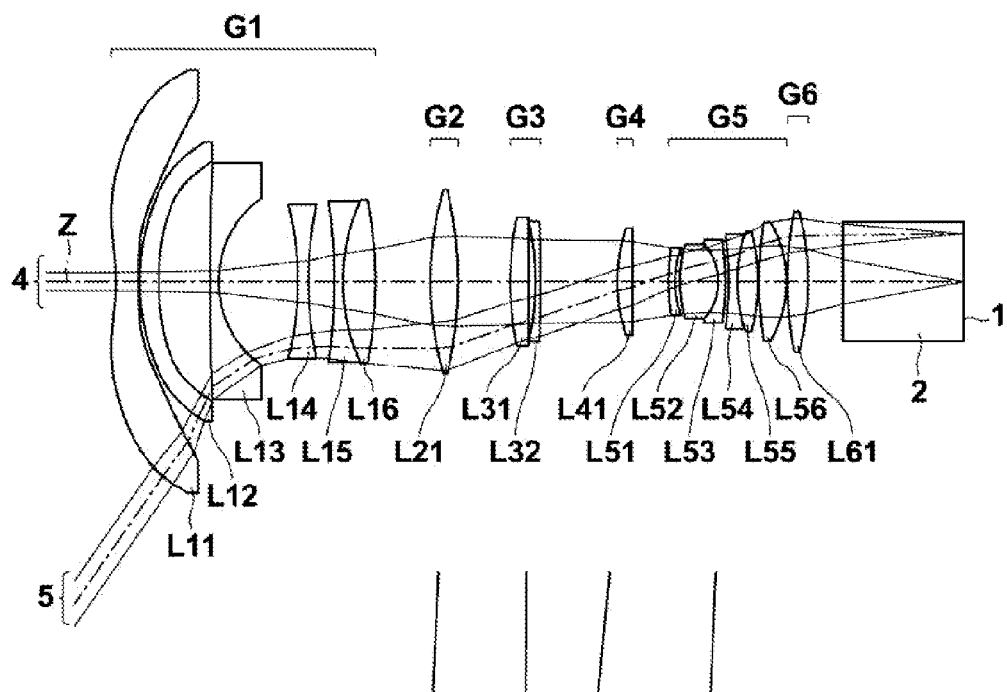
TELE
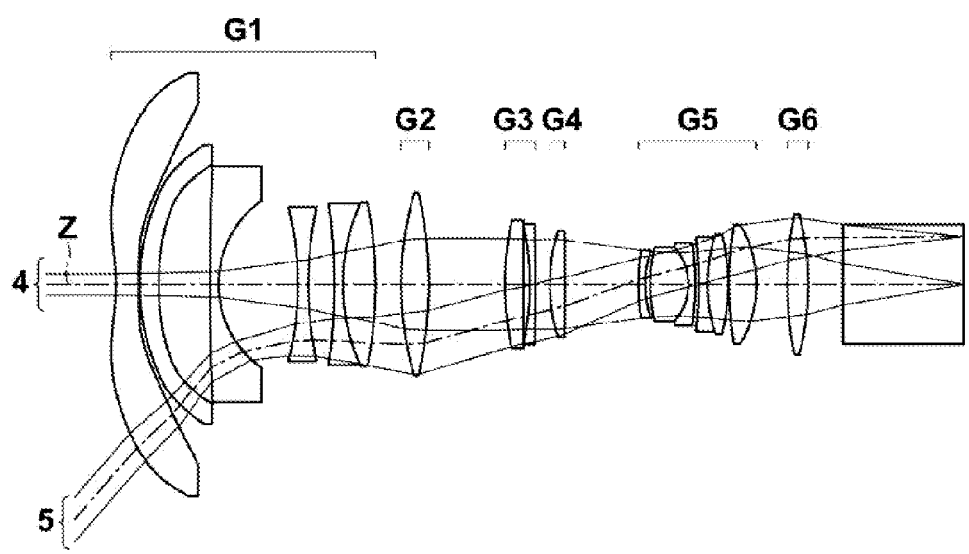

FIG.7
EXAMPLE 7
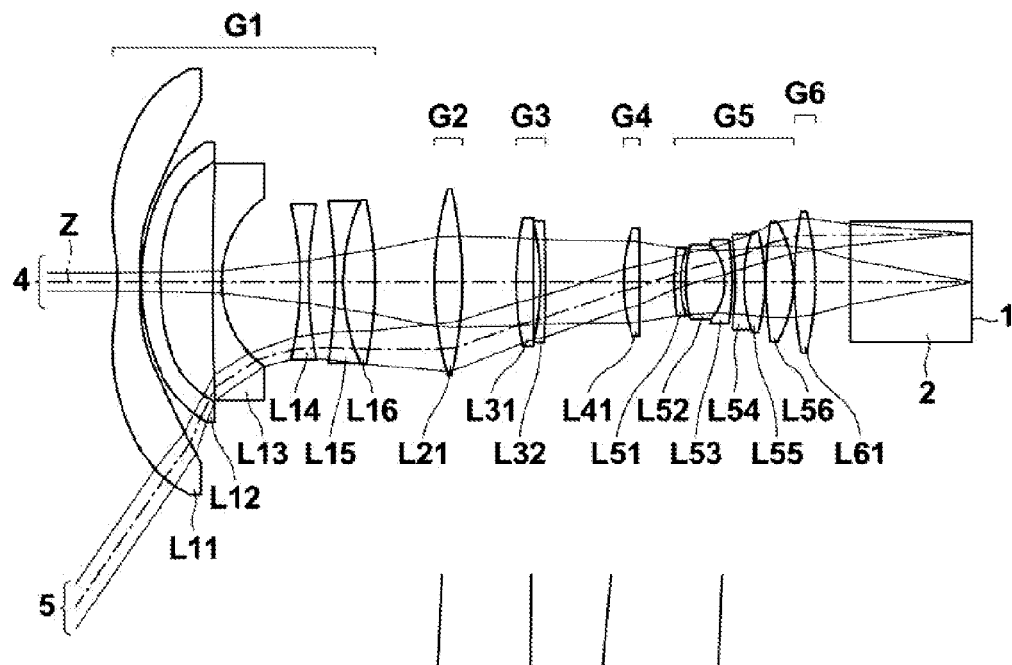
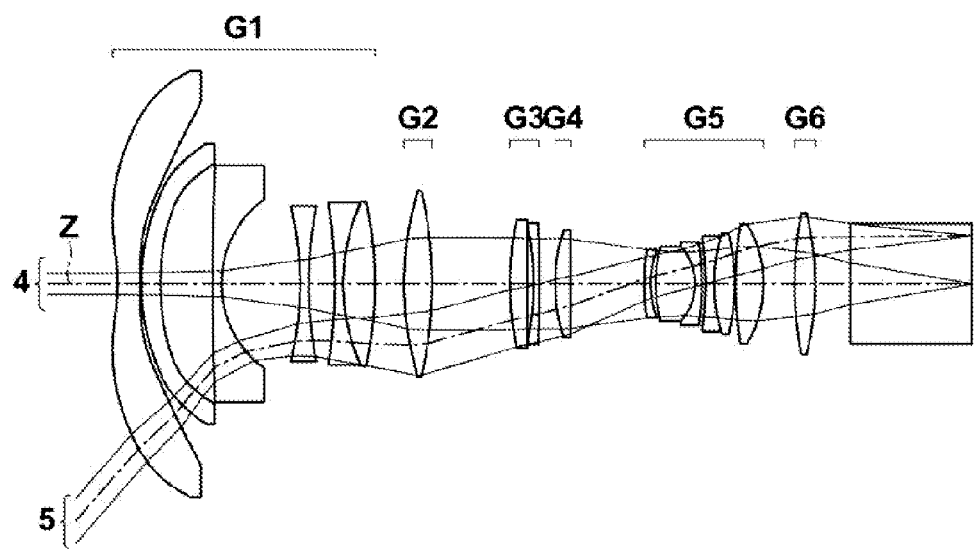

FIG.8
EXAMPLE 8
WIDE
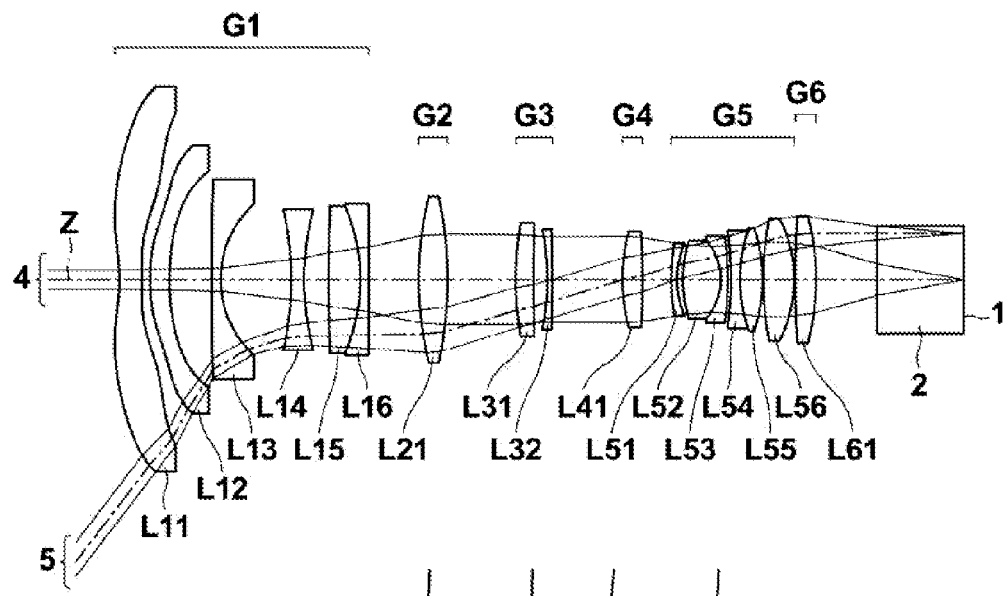
TELE
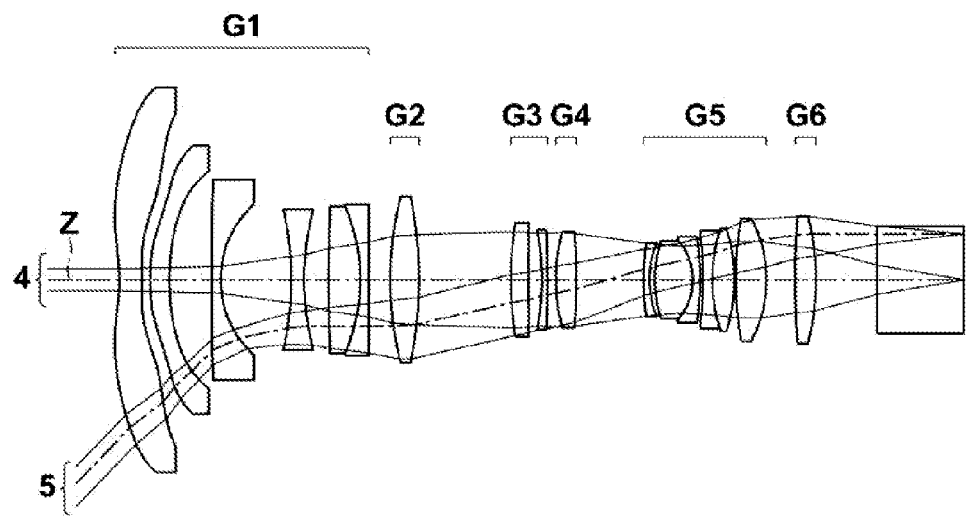

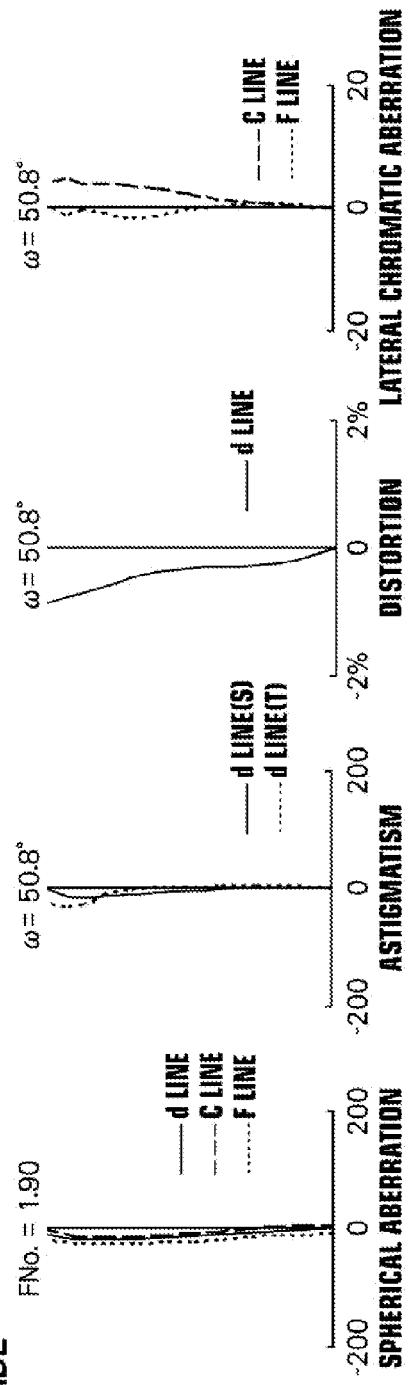
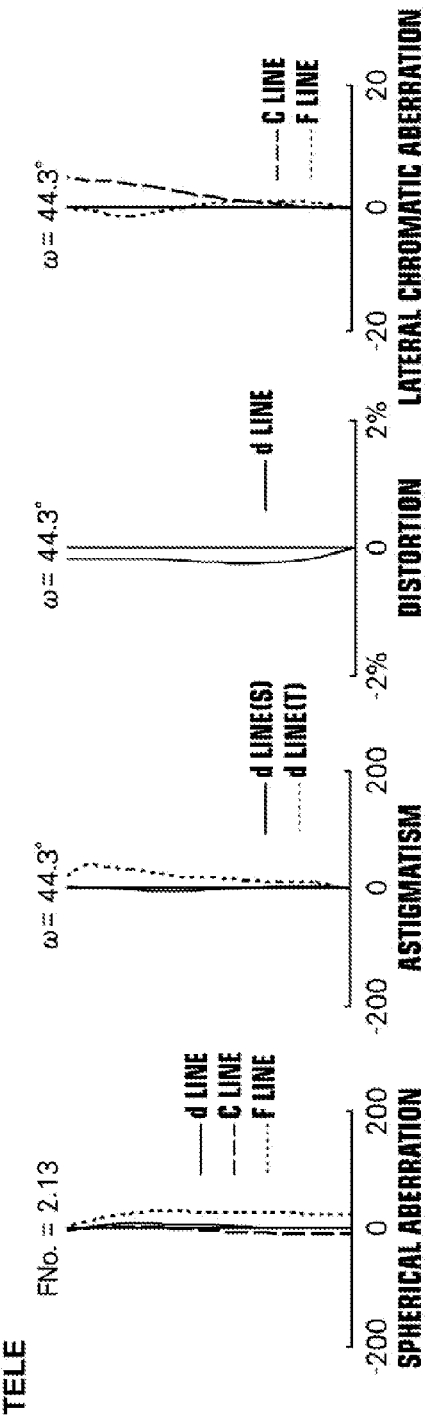
FIG.9

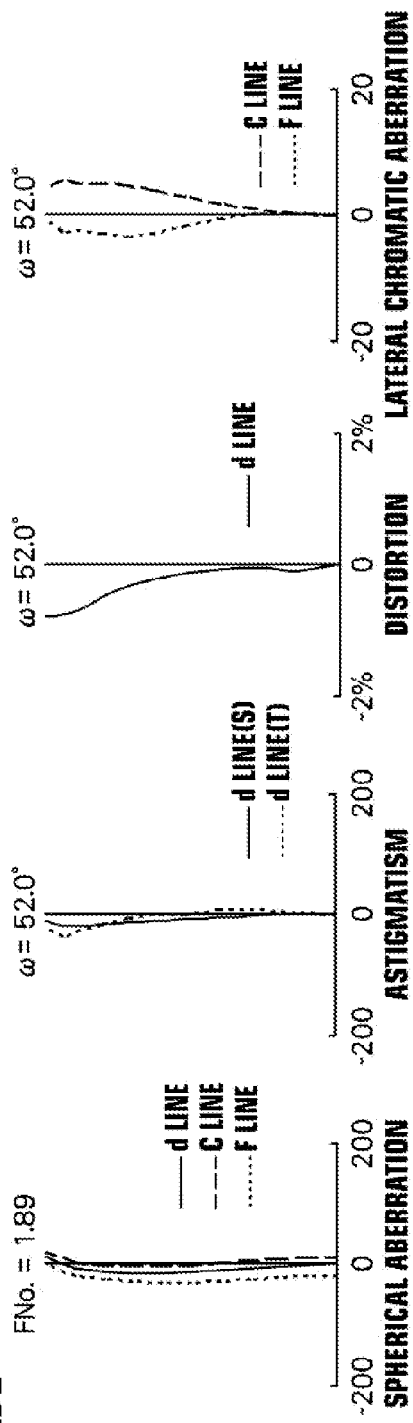
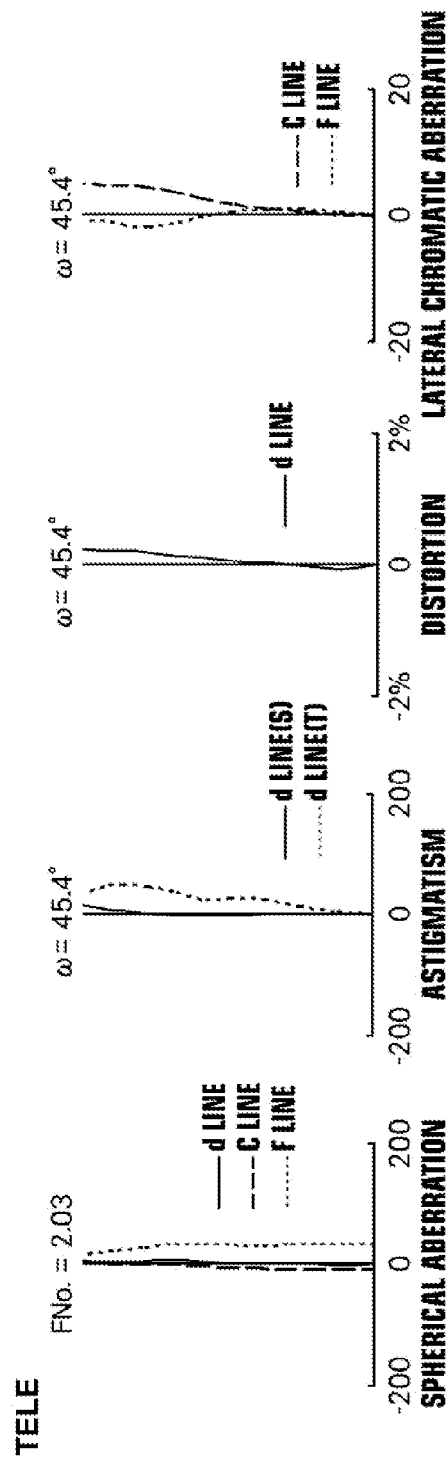
FIG.11 EXAMPLE 3

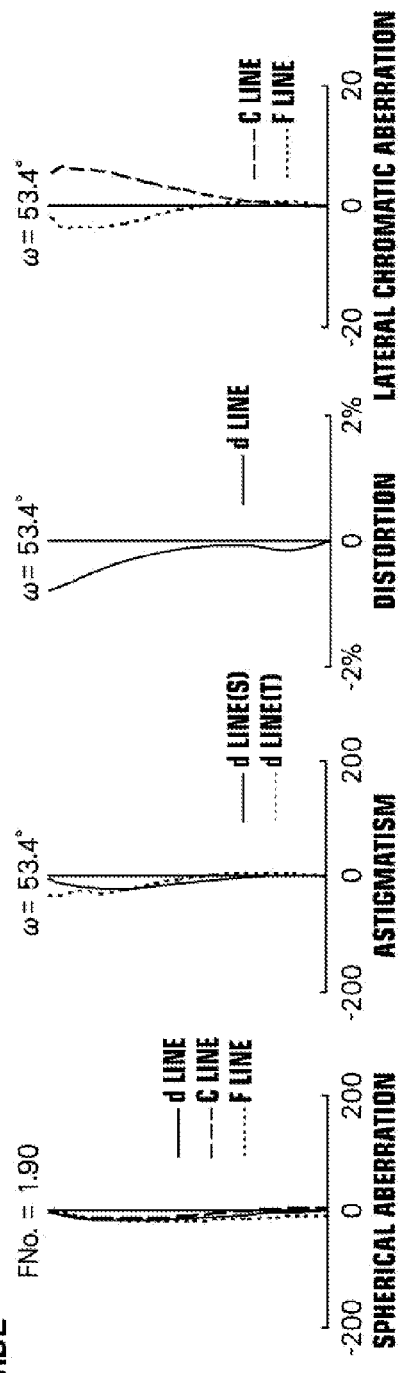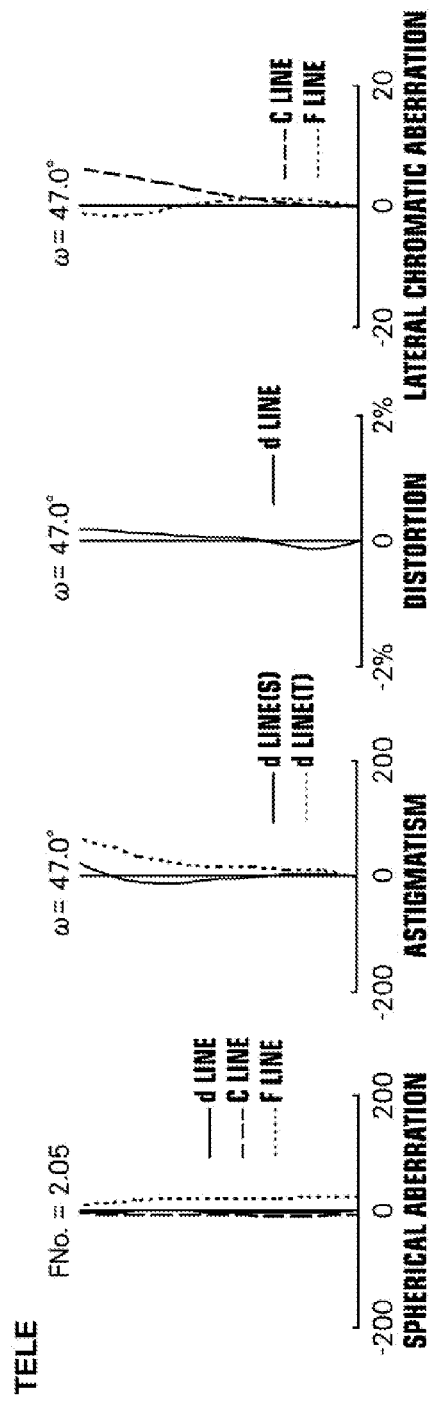
FIG.12

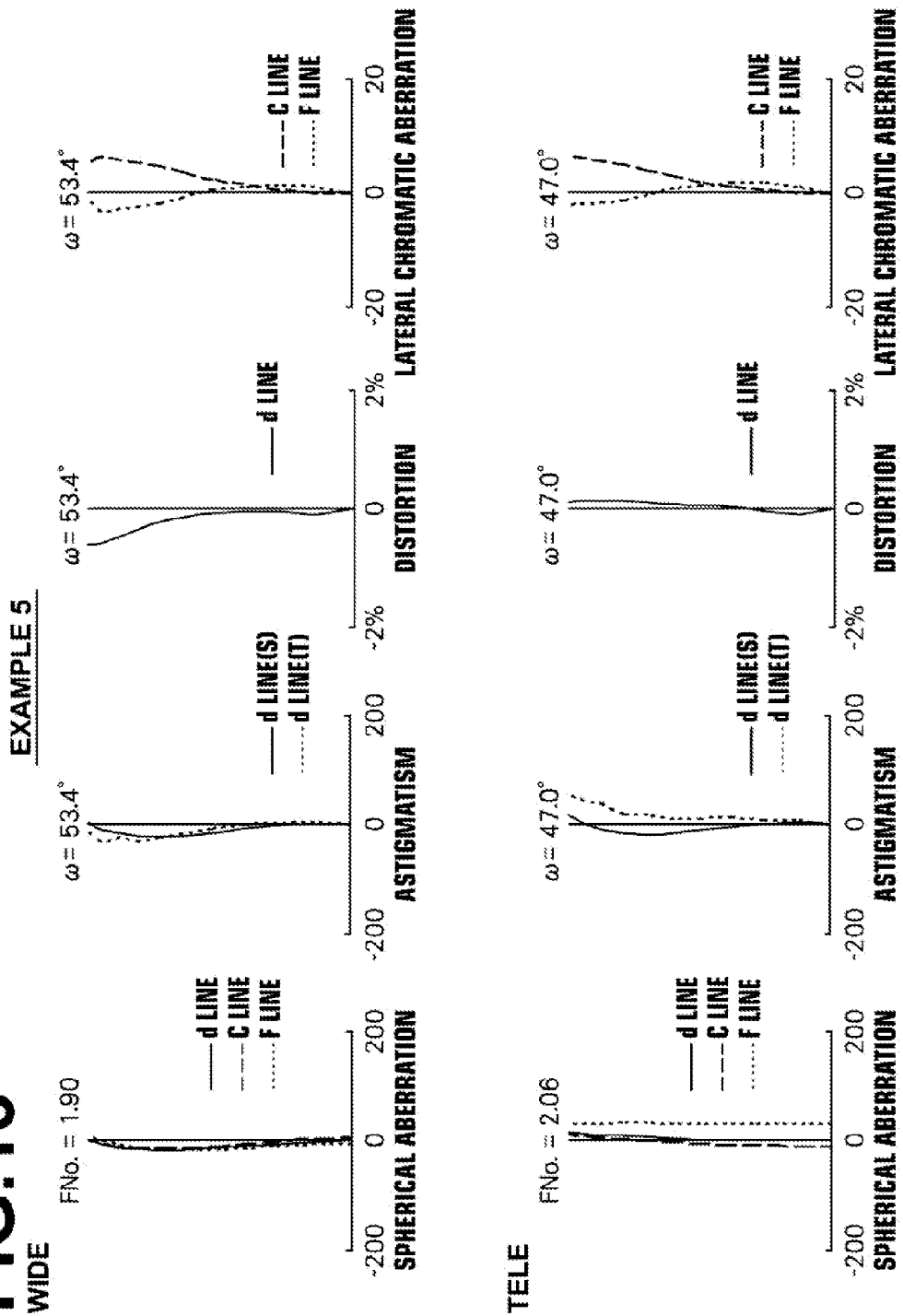

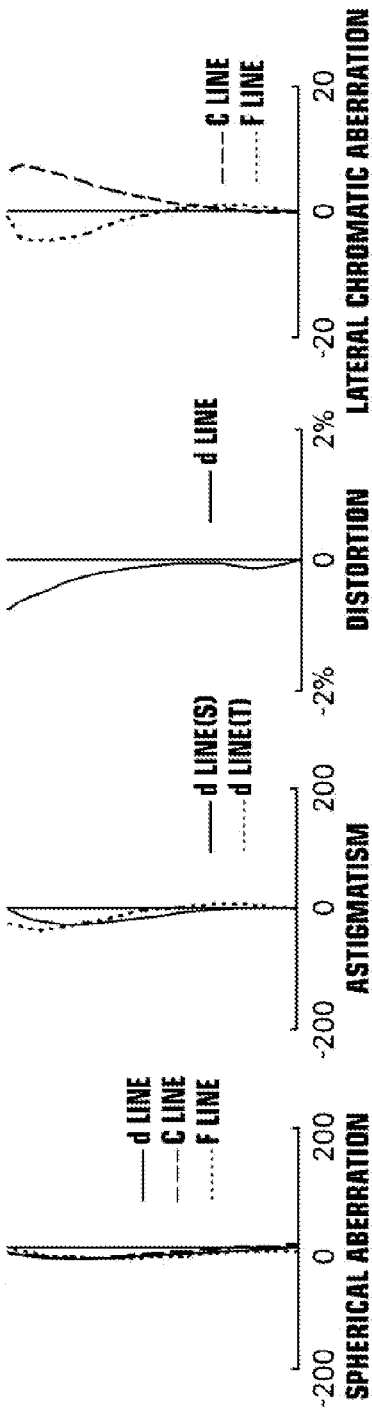
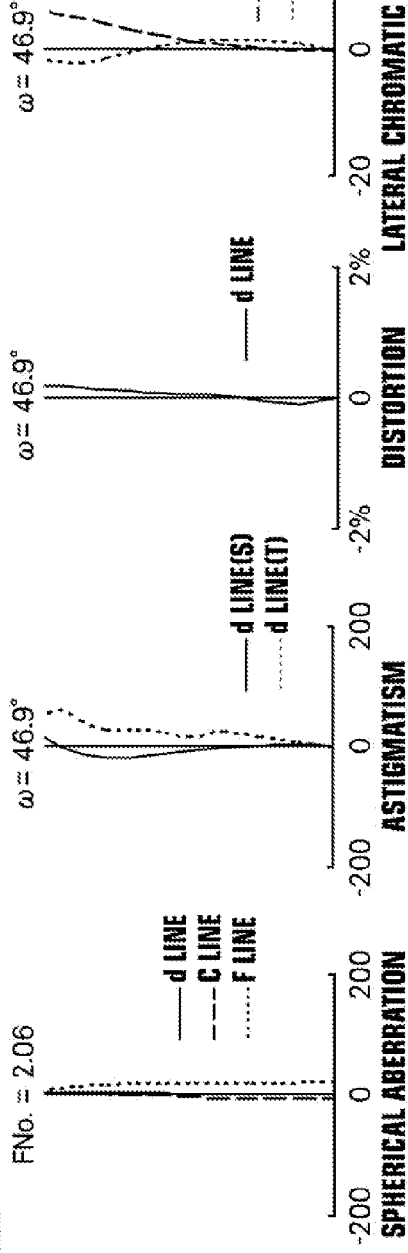
FIG.14 EXAMPLE 6

FIG.15
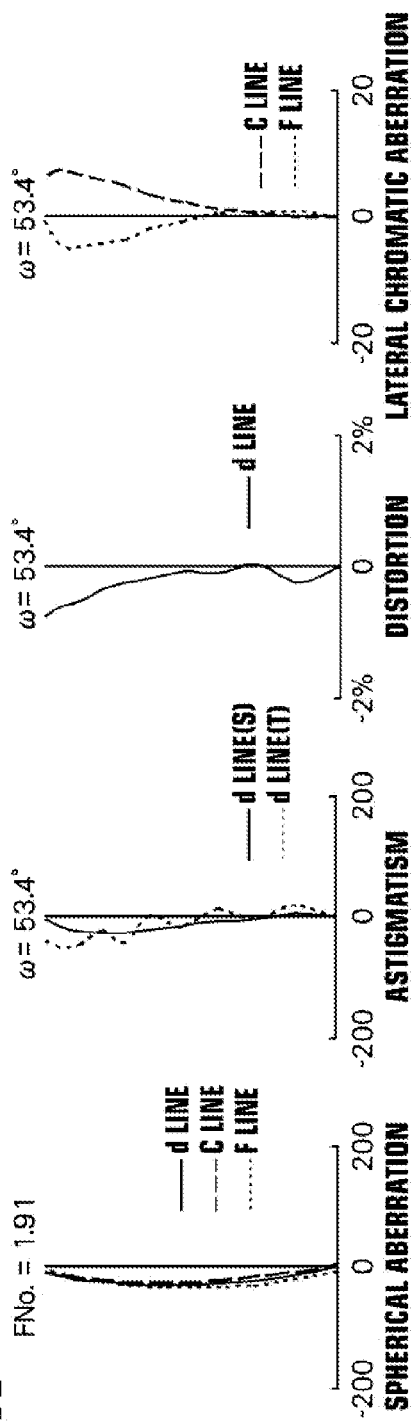
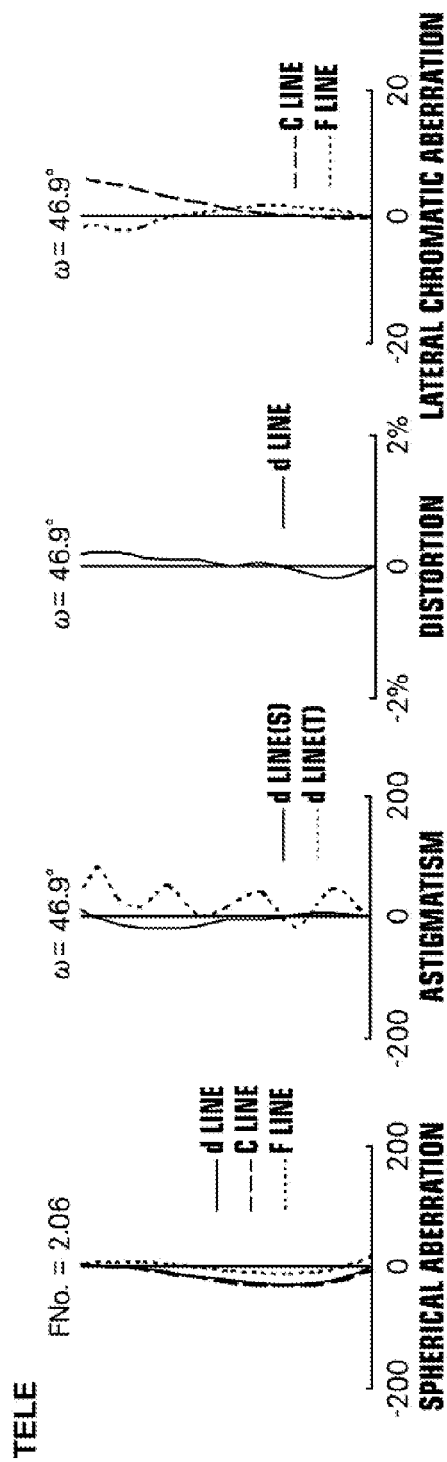

PROJECTION ZOOM LENS AND PROJECTION TYPE DISPLAY DEVICE

CROSS REFERENCE TO RELATED APPLICATIONS

The present application claims priority under 35 USC §119 to Japanese Patent Application No. 2014-175044 filed on Aug. 29, 2014. The above application is hereby expressly incorporated by reference in its entirety, into the present application.

BACKGROUND

The present disclosure is related to a projection zoom lens and a projection type display device, for example, to a projection zoom lens that can be favorably used for magnified projection of beams that bear video information from a light valve onto a screen, and to a projection type display device employing such a projection zoom lens.

Conventionally, projection type display devices that magnify and project images displayed on a light valve, such as liquid crystal display elements, are in wide use. In optical systems that utilize transmissive liquid crystal display elements as light valves, cross dichroic prisms are generally employed to combine colors. In order to improve color combining properties taking the angular dependency of the cross dichroic prisms into consideration, it is desired for projection lenses to be employed in such optical systems to be configured to be telecentric at the reduction side. In addition, there is a tendency for zoom lenses which are capable of changing magnification to be preferred as projection lenses, such that image sizes which are projected according to screen sizes can be adjusted even in cases that the degree of freedom of installation conditions is low.

Examples of known zoom lenses which are configured to be telecentric at the reduction side and are suited for use as projection lenses are those disclosed in Japanese Unexamined Patent Publication No. 2008-304765, Japanese Patent No. 5254146, and Japanese Patent No. 5378162. Japanese Unexamined Patent Publication No. 2008-304765, Japanese Patent No. 5254146, and Japanese Patent No. 5378162 disclose zoom lenses constituted by five or six lens groups, in which the lens group most toward the magnification side has a negative refractive power.

SUMMARY

In cases that a projection type display device is to be employed for a presentation, there are often cases in which a large image size is desired within a space having a comparatively short depth and a short projection distance. In addition, in cases that a projection type display device is employed for use in a home theater system or the like, there is great demand to view video on a large screen. Due to these circumstances, there is demand for a projection zoom lens having a wider angle of view, in order to enable projection of images onto larger screens with shorter projection distances.

However, the angles of view of the lens systems disclosed in Japanese Unexamined Patent Publication No. 2008-304765, Japanese Patent No. 5254146, and Japanese Patent No. 5378162 are insufficient to meet the recent demand for wider angles of view, and a further widening of the angle of view is desired.

Meanwhile, price competition is escalating in the market of projection type display devices. Therefore, reduction of costs is also desired in projection lenses as well.

The present disclosure has been developed in view of the foregoing circumstances. The present disclosure provides a projection zoom lens having a wide angle of view and high optical performance at low cost. The present disclosure also provides a projection type display device equipped with such a projection zoom lens.

A projection zoom lens of the present disclosure essentially consists of, in order from the magnification side to the reduction side:

a first lens group having a negative refractive power, which is fixed when changing magnification;

a second lens group having a positive refractive power, which moves when changing magnification;

a plurality of other lens groups; and a final lens group, which is fixed when changing magnification;

the distances among all adjacent lens groups changing when changing magnification;

a first and a second lens from the magnification side within the first lens group being a first lens, which is a single lens having an aspherical surface with a concave surface toward the magnification side in the paraxial region and a negative refractive power in the paraxial region, and a second lens, which is a single lens having an aspherical surface, and in the case that a third lens from the magnification side within the first lens group is a third lens, a first lens group front group consisting of the first lens, the second lens, and the third lens has a negative refractive power, the intersection between the surface of the first lens toward the magnification side and a principal light ray at a maximum angle of view is positioned more toward the reduction side than the intersection between the surface of the first lens toward the magnification side and the optical axis, the intersection between the surface of the first lens toward the reduction side and the principal light ray at the maximum angle of view is positioned more toward the reduction side than the intersection between the surface of the first lens toward the reduction side and the optical axis, the intersection between the surface of the second lens toward the magnification side and the principal light ray at the maximum angle of view is positioned more toward the reduction side than the intersection between the surface of the second lens toward the magnification side and the optical axis, the intersection between the surface of the second lens toward the reduction side and the principal light ray at the maximum angle of view is positioned more toward the reduction side than the intersection between the surface of the second lens toward the reduction side and the optical axis, and all of Conditional Formulae (1) through (3) below are satisfied:

$$30 \cdot 10^{-6} < |dn1/dt| \tag{1}$$

$$30 \cdot 10^{-6} < |dn2/dt| \tag{2}$$

$$1.0 < fL3/fG1A < 2.0 \tag{3}$$

wherein dn1/dt is the temperature coefficient of the refractive index of the first lens with respect to the d line, dn2/dt is the temperature coefficient of the refractive index of the second lens with respect to the d line, fL3 is the focal length of the third lens, and fG1A is the focal length of first lens group front group.

Note that dn1/dt and dn2/dt are average temperature coefficients of the refractive indices within a range from 25° C. to 40° C. In addition, in an optical system in which the focal length of the first lens group front group changes under various conditions, such as an optical system in which only a portion of the first lens group front group is employed to perform focusing operations, it is not necessary for Conditional Formula (3) to be satisfied under all conditions, and it is only necessary for a condition in which Conditional Formula (3) is satisfied to be present.

In the projection zoom lens of the present disclosure, it is preferable for one or arbitrary combinations of Conditional Formulae (4) through (14) below to be satisfied.

$$-2.0 < R1/H1 < -0.5 \quad (4)$$

$$0.8 < enP/Bf < 1.5 \quad (5)$$

$$-20 < fL1a2/fw < -8 \quad (6)$$

$$2.5 < H1/D4 < 6.0 \quad (7)$$

$$1.0 < (Im\phi \cdot enP)/(H1 \cdot fw) < 2.0 \quad (8)$$

$$fw/|fL1| + fw/|fL2| < 0.15 \quad (9)$$

$$L/Im\phi < 10 \quad (10)$$

$$1.0 < Bf/Im\phi < 2.0 \quad (11)$$

$$1.5 < Im\phi/fw < 4.0 \quad (12)$$

$$4.0 < fG2/fw < 8.0 \quad (13)$$

$$3.0 < fG5a6/fw < 6.0 \quad (14)$$

$$FNo. \text{ max} < 3.00 \quad (15)$$

wherein R1 is the paraxial radius of curvature of the surface of the first lens toward the magnification side, H1 is the height of a principal light ray at a maximum angle of view on the surface of the first lens toward the magnification side, enP is the distance from the lens surface most toward the magnification side to the position of a magnification side pupil along the optical axis, Bf is an air converted length from the lens surface most toward the reduction side to a reduction side focal point position along the optical axis, fL1a2 is the combined focal length of the first lens and the second lens, fw is the focal length of the entire projection zoom lens at the wide angle end, D4 is the distance between the second lens and the third lens along the optical axis, Imϕ is the maximum effective image circle diameter at the reduction side, fL1 is the focal length of the first lens, fL2 is the focal length of the second lens, L is the distance from the lens surface most toward the magnification side to the reduction side focal point position along the optical axis in the case that the distance between the lens surface most toward the reduction side to the reduction side focal point position is an air converted distance, fG2 is the focal length of the second lens group, fG5a6 is the combined focal length of the lens group most toward the reduction side from among the plurality of other lens groups and the final lens group, and FNo. max is a maximum F number.

Note that the "maximum angle of view" refers to the maximum angle of view across the entire magnification range. H1 and enP are values at the wide angle end when the projection distance is infinity. The sign of H1 is always positive. The sign of enP is positive in the case that the magnification side pupil position is more toward the reduction side than the lens surface most toward the magnification side, and negative in the case that the magnification side pupil position is more toward the magnification side than the lens surface most toward the magnification side. The sign of R1 is positive in the case that the surface shape is convex toward the magnification side in the paraxial region, and negative in the case that the surface shape is convex toward the reduction side in the paraxial region. FNo. max is the maximum F number across the entire magnification range.

It is preferable for the projection zoom lens of the present disclosure to be telecentric at the reduction side.

In addition, in the projection zoom lens of the present disclosure, it is preferable for all of the plurality of other lens groups provided between the second lens group and the final lens group to move when changing magnification.

In addition, it is preferable for the entirety of the projection zoom lens of the present disclosure to essentially consist of six lens groups.

A projection type display device of the present disclosure comprises:

a light source;

a light valve, into which light from the light source enters; and the projection zoom lens of the present disclosure that projects optical images formed by light modulated by the light valve onto a screen.

Note that the "magnification side" refers to the side toward which optical images are projected (the side toward a screen). For the sake of convenience, the side toward the screen will be referred to as the magnification side even in cases that optical images are reduced and projected. Meanwhile, the "reduction side" refers to a side toward an original image display region (the side toward a light valve). For the sake of convenience, the side toward the light valve will be referred to as the reduction side even in cases that images are reduced and projected.

Note that the expression "essentially consist(s) of" means that the projection zoom lens may include: lenses without any practical refractive power; and optical elements other than lenses such as stops and a cover glass, in addition to the constituent elements which are listed above.

Note that a "lens group" is not necessarily constituted by a plurality of lenses, and may be constituted by a single lens.

Note that the signs of the refractive powers of the lens groups, the signs of the refractive powers of the lenses, and the surface shapes of the lenses will be considered as being those in the paraxial region for those that include aspherical surfaces, unless otherwise noted.

In addition, in the present disclosure, compound aspherical lenses (a lens constituted by a spherical lens and a film having an aspherical shape formed integrally on the spherical lens, that functions as a single aspherical lens as a whole) are not considered a cemented lens, but are treated as single lenses.

According to the present disclosure, the configurations of the first through third lenses from the magnification side are favorably set in a zoom lens that adopts a negative lead lens group configuration and has five or more lens groups. Therefore, a widening of the angle of view and a reduction in cost can be realized, and a projection zoom lens having high optical performance can be provided. In addition, a projection type display device equipped with this projection zoom lens can also be realized.

BRIEF DESCRIPTION OF THE DRAWINGS

FIG. 2 is a collection of sectional diagrams that illustrate the lens configuration of and trajectories of rays of light through a projection zoom lens according to Example 2 of the present disclosure.

FIG. 3 is a collection of sectional diagrams that illustrate the lens configuration of and trajectories of rays of light through a projection zoom lens according to Example 3 of the present disclosure.

FIG. 4 is a collection of sectional diagrams that illustrate the lens configuration of and trajectories of rays of light through a projection zoom lens according to Example 4 of the present disclosure.

FIG. 5 is a collection of sectional diagrams that illustrate the lens configuration of and trajectories of rays of light through a projection zoom lens according to Example 5 of the present disclosure.

FIG. 6 is a collection of sectional diagrams that illustrate the lens configuration of and trajectories of rays of light through a projection zoom lens according to Example 6 of the present disclosure.

FIG. 7 is a collection of sectional diagrams that illustrate the lens configuration of and trajectories of rays of light through a projection zoom lens according to Example 7 of the present disclosure.

FIG. 8 is a collection of sectional diagrams that illustrate the lens configuration of and trajectories of rays of light through a projection zoom lens according to Example 8 of the present disclosure.

FIG. 9 is a collection of diagrams that illustrate aberrations of the projection zoom lens according to Example 1, the diagrams illustrating spherical aberration, astigmatism, distortion, and lateral chromatic aberrations in this order from the left side of the drawing sheet.

FIG. 11 is a collection of diagrams that illustrate aberrations of the projection zoom lens according to Example 3, the diagrams illustrating spherical aberration, astigmatism, distortion, and lateral chromatic aberrations in this order from the left side of the drawing sheet.

FIG. 12 is a collection of diagrams that illustrate aberrations of the projection zoom lens according to Example 4, the diagrams illustrating spherical aberration, astigmatism, distortion, and lateral chromatic aberrations in this order from the left side of the drawing sheet.

FIG. 13 is a collection of diagrams that illustrate aberrations of the projection zoom lens according to Example 5, the diagrams illustrating spherical aberration, astigmatism, distortion, and lateral chromatic aberrations in this order from the left side of the drawing sheet.

FIG. 14 is a collection of diagrams that illustrate aberrations of the projection zoom lens according to Example 6, the diagrams illustrating spherical aberration, astigmatism, distortion, and lateral chromatic aberrations in this order from the left side of the drawing sheet.

FIG. 15 is a collection of diagrams that illustrate aberrations of the projection zoom lens according to Example 7, the diagrams illustrating spherical aberration, astigmatism, distortion, and lateral chromatic aberrations in this order from the left side of the drawing sheet.

BEST MODE FOR CARRYING OUT THE DISCLOSURE

Figure 1:
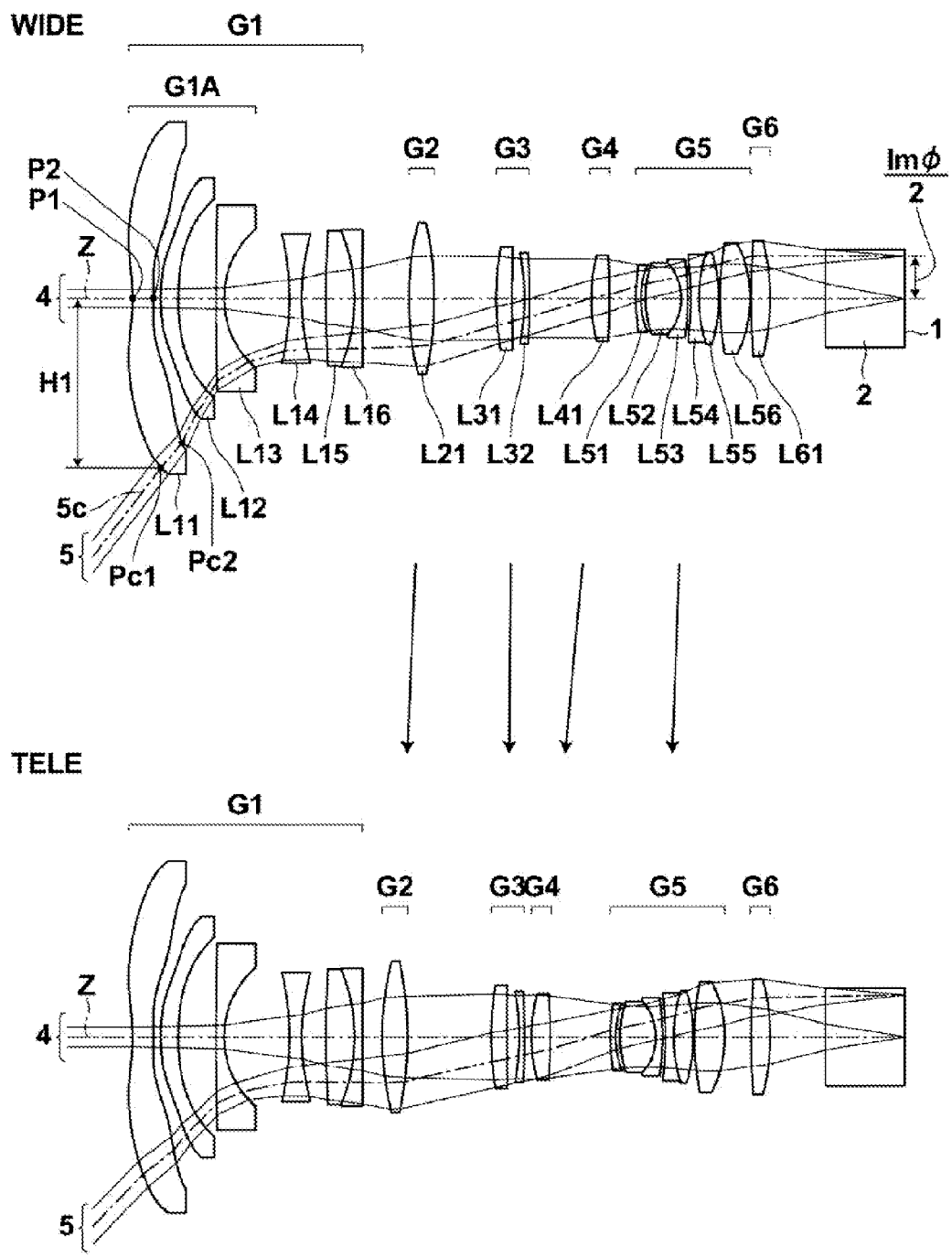
FIG. 1 is a collection of sectional diagrams that illustrate the lens configuration of and trajectories of rays of light through a projection zoom lens according to an embodiment of the present disclosure that corresponds to Example 1 of the present disclosure.

Hereinafter, embodiments of the present disclosure will be described in detail with reference to the accompanying drawings. FIG. 1 is a collection of sectional diagrams that illustrate the lens configuration of and the trajectories of an axial light beam 4 and a light beam 5 at a maximum angle of view through a projection zoom lens according to an embodiment of the present disclosure. The example illustrated in FIG. 1 corresponds to a projection zoom lens of Example 1 to be described later. In FIG. 1, the left side is the magnification side, and the right side is the reduction side. The lens system illustrated in FIG. 1 is configured as a zoom lens system, which is more versatile than a fixed focus lens system. The upper portion of FIG. 1 labeled "WIDE" illustrates the state of the projection zoom lens at the wide angle end, and the lower portion of FIG. 1 labeled "TELE" illustrates the state of the projection zoom lens at the telephoto end. Arrows that schematically indicate the directions of movement of each lens group as magnification is changed from the wide angle end to the telephoto end are illustrated between the upper portion and the lower portion of FIG. 1.

The projection zoom lens illustrated in FIG. 1 is of a six group configuration, constituted by, in order from the magnification side to the reduction side, a first lens group G1 having a negative refractive power, a second lens group G2 having a positive refractive power, a third lens group G3, a fourth lens group G4, a fifth lens group G5, and a sixth lens group G6. When changing magnification, the first lens group G1 and the sixth lens group G6 are fixed with respect to an image plane, while the four lens groups constituted by the second lens group G2 through the fifth lens group G5 move.

This projection zoom lens is capable of being utilized as a projection zoom lens which is mounted on a projection type display device, for example, and projects image information displayed on a light valve onto a screen. Presuming a case in which the projection zoom lens is mounted on a projection type display device, a glass block 2, which functions as a prism, various filters, a cover glass, etc., and the image display surface 1 of a light valve, positioned at the surface of the glass block 2 toward the reduction side, are also illustrated in FIG. 1.

In the projection type display device, light beams, to which the image information is imparted by the image display surface 1, enter the projection zoom lens via the glass block 2. The projection zoom lens projects the beams onto a screen (not shown) disposed toward the left side direction of the drawing sheet.

Note that although FIG. 1 illustrates an example in which the position of the surface of the glass block 2 toward the reduction side and the position of the image display surface 1 are the same, the projection zoom lens of the present disclosure is not limited to such a configuration. In addition, FIG. 1 illustrates only one image display surface 1. However, the projection type display device may be configured to separate beams from a light source into three primary colors with a color separating optical system. In this case, three light valves that respectively correspond to the three primary colors may be provided, to enable display of full color images.

The projection zoom lens of the present embodiment essentially consists of, in order from the magnification side to the reduction side, a first lens group G1 having a negative refractive power which is fixed when changing magnification, a second lens group G2 having a positive refractive power which moves when changing magnification, a plurality of lens groups, and a final lens group which is fixed when changing magnification. In the example illustrated in FIG. 1, the third lens group G3, the fourth lens group G4, and the fifth lens group G5 are the plurality of lens groups, and the sixth lens group G6 is the final lens group. Hereinbelow, the plurality of lens groups which are provided between the second lens group G2 and the final lens group will be collectively referred to as "intermediate lens groups".

In the projection zoom lens of the present embodiment, the distances among all adjacent lens groups change when changing magnification. That is, not only do the distance between the second lens group G2 and the intermediate lens groups and the distance between the intermediate lens groups and the final lens group change when changing magnification, but the distances among adjacent lens groups that constitute the intermediate lens groups also change when changing magnification. In the example illustrated in FIG. 1, the distances between all adjacent lens groups change among the first lens group G1 through the sixth lens group G6 when changing magnification.

Configuring the first lens group G1, which is the lens group most toward the magnification side, to be a negative lens group, is advantageous from the viewpoint of widening the angle of view. Configuring the second lens group G2 to be a positive lens group is advantageous from the viewpoint of suppressing increases in the diameters of the first and second lenses from the magnification side within the first lens group G1. In addition, this configuration is also advantageous from the viewpoint of widening the angle of view, because the negative first lens group G1 and the positive second lens group G2 can function as a wide converter with respect to the third lens group G3 and the lens groups more toward the reduction side than the third lens group G3.

Note that it is only necessary for the distances among each pair of adjacent lens groups that constitute the intermediate lens groups to change when changing magnification, and a portion of the intermediate lens groups may be fixed when changing magnification. In the case that the intermediate lens group includes a fixed portion, the number of lens groups that move when changing magnification can be minimized, and thereby a drive mechanism may be simplified. Alternatively, all of the lens groups that constitute the intermediate lens groups may move when changing magnification. In this case, fluctuations in aberrations, particularly fluctuations in field curvature, can be suppressed throughout the entire magnification range.

Note that the number of lens groups that constitute the intermediate lens groups may be arbitrarily set, and may be three, as in the example illustrated in FIG. 1. In the case that the entire system is configured to consist of six lens groups in this manner, realizing high performance can be facilitated.

The first lens group G1 of the projection zoom lens of the present embodiment is configured as follows, in order to realize high performance, a wide angle of view, and cost reduction. Hereinbelow, the first through third lenses from the magnification side within the first lens group G1 will be referred to as a first lens L11, a second lens L12, and a third lens L13. A lens group constituted by these three lenses will be referred to as a first lens group front group G1A.

The first lens L11 is a single lens having an aspherical surface with a concave surface toward the magnification side in the paraxial region and a negative refractive power in the paraxial region. The second lens L12 is a single lens having an aspherical surface. The first lens group front group G1A has a negative refractive power. The intersection Pc1 between the surface of the first lens L11 toward the magnification side and a principal light ray 5c at a maximum angle of view is positioned more toward the reduction side than the intersection P1 between the surface of the first lens L11 toward the magnification side and the optical axis Z. The intersection Pc2 between the surface of the first lens L11 toward the reduction side and the principal light ray 5c at the maximum angle of view is positioned more toward the reduction side than the intersection P2 between the surface of the first lens L11 toward the reduction side and the optical axis Z. The intersection between the surface of the second lens L12 toward the magnification side and the principal light ray 5c at the maximum angle of view is positioned more toward the reduction side than the intersection between the surface of the second lens L12 toward the magnification side and the optical axis Z. The intersection between the surface of the second lens L12 toward the reduction side and the principal light ray 5c at the maximum angle of view is positioned more toward the reduction side than the intersection between the surface of the second lens L12 toward the reduction side and the optical axis Z. Further, all of Conditional Formulae (1) through (3) below are satisfied:

$$30 \cdot 10^{-6} < |dn1/dt| \qquad (1)$$

$$30 \cdot 10^{-6} < |dn2/dt| \qquad (2)$$

$$1.0 < fL3/fG1A < 2.0 \qquad (3)$$

wherein dn1/dt is the temperature coefficient of the refractive index of the first lens with respect to the d line, dn2/dt is the temperature coefficient of the refractive index of the second lens with respect to the d line, fL3 is the focal length of the third lens, and MIA is the focal length of first lens group front group.

The operational effects of the configuration of the first lens group G1 described above will be described below. Configuring the first lens group front group G1A constituted by the first through third lenses from the magnification side of the entire system to be a lens group having a negative refractive power is advantageous from the viewpoint of widening the angle of view. At the same time, securing a back focus sufficiently long enough to insert a prism or the like between the lens system and the image display surface 1 is facilitated. The first lens L11 is a lens having a negative refractive power in the paraxial region, to provide a lens having a negative refractive power most toward the magnification side in the entire system. Thereby, securing a back focus sufficiently long enough to insert a prism or the like between the lens system and the image display surface 1 is facilitated further. Configuring both the first lens L11 and the second lens L12 to be aspherical lenses is advantageous from the viewpoint of favorably correcting distortion and field curvature, which are likely to become problems when the angle of view is widened.

The first lens L11 has the shape related to the aforementioned intersections P1, Pc1, P2, and Pc2 described above. Therefore, the outer diameter of the first lens L11, which tends to become great in wide angle optical systems, can be decreased, which is advantageous from the viewpoint of correcting distortion and contributes to a reduction in cost. Similar advantageous effects are also obtained by the second lens L12 having a similar shape related to the intersection P1, etc. as that of the first lens L11.

Here, in the case that the surface of the first lens L11, which has the aforementioned shape related to the intersections P1 and Pc1, toward the magnification side is convex, the amount of sag at the point Pc1 will become great. Note that the amount of sag is the length of a normal line from a point on an aspherical surface that extends to a plane perpendicular to the optical axis that contacts the peak of the aspherical surface. The amount of sag at the point Pa is the length of a normal line from the point Pc1 that extends to a plane perpendicular to the optical axis that passes through the intersection P1. If the amount of sag at the point Pc1 becomes great, the amount of sag at the point Pc2 will also increase, resulting in a deterioration of formability. If aberrations are to be corrected favorably with the amounts of sag at the points Pc1 and Pc2 being great, the amount of sag at the intersection between the surface of the second lens L12 toward the magnification side and the principal light ray 5c at the maximum angle of view will also become great, and the formability of the second lens L12 will also deteriorate. For these reasons, the first lens L11 is configured such that the surface thereof toward the magnification side is concave in the paraxial region in the present embodiment, in order to suppress an increase in the amount of sag at the point Pc1 and to prevent deterioration in the formability of the lens. Formability influences cost, and therefore the lens system can achieve a reduction in cost by the first lens L11 being configured to be the shape described above.

Regarding Conditional Formulae (1) and (2), inexpensive materials can be selected for the first lens L11 and the second lens L12, by these formulae being satisfied. The diameters of the first lens L11 and the second lens L12, which are the first and second lenses from the magnification side, tend to be great in wide angle optical systems. Generally, material costs will increase as lens diameters become greater. In addition, it is preferable for the first lens L11 and the second lens L12 to be aspherical lenses from the viewpoint of correcting aberrations. However, aspherical lenses are more costly than spherical lenses, depending on production methods. Therefore, materials that satisfy Conditional Formulae (1) and (2) are selected for the first lens L11 and the second lens L12, which are large diameter aspherical lenses, in the present embodiment, in order to reduce costs.

Regarding Conditional Formula (3), by the lens system in which the first lens group front group G1A is a negative lens group satisfying Conditional Formula (3), the third lens L13 will be a negative lens. By regulating the ratio of the focal length of the first lens group front group G1A and the focal length of the third lens L13 such that the value of fL3/fG1A is not less than or equal to the lower limit defined in Conditional Formula (3), a necessary amount of negative refractive power can be secured by the third lens L13, without increasing the combined refractive power of the first lens L11 and the second lens L12. Inexpensive materials that satisfy Conditional Formulae (1) and (2) tend to have large coefficients of linear expansion. However, by maintaining the value of fL3/fG1A such that it is not less than or equal to the lower limit defined in Conditional Formula (3), it will not be necessary to increase the combined refractive power of the first lens L11 and the second lens L12. Therefore, suppressing movement of the position focused on by the first lens L11 and the second lens L12 can be facilitated when the ambient temperature changes, even if materials having large coefficients of linear expansion are employed for the first lens L11 and the second lens L12. By configuring the projection zoom lens such that the value of fL3/fG1A is not greater than or equal to the upper limit of Conditional Formula (3), correction of field curvature and lateral chromatic aberration will be facilitated.

It is more preferable for Conditional Formula (3-1) below to be satisfied, and even more preferable for Conditional Formula (3-2) below to be satisfied, in order to cause the above advantageous effects related to Conditional Formula (3) to become more prominent.

$$1.0<fL3/fG1A<1.8 \quad (3\text{-}1)$$

$$1.1<fL3/fG1A<1.6 \quad (3\text{-}2)$$

In addition, there is concern that cemented lenses will separate from each other due to changes in temperature in the case that cemented lenses are formed by lenses having large coefficients of linear expansion. However, the present embodiment avoids such a concern by configuring both the first lens L11 and the second lens L12 as single lenses.

Note that the sign of the refractive power of the second lens L12 may be either positive or negative in the paraxial region. In the case that the second lens L12 has a positive refractive power in the paraxial region, suppressing movement of the position focused on by optical system formed by a combination of the first lens L11 and the second lens L12 due to changes in ambient temperature can be facilitated because the first lens L11 has a negative refractive power in the paraxial region. In the case that the second lens L12 has a negative refractive power in the paraxial region, the first through third lenses from the magnification side will all have negative refractive powers, which is advantageous from the viewpoint of widening the angle of view.

Further, in the projection zoom lens of the present embodiment, it is preferable for one or arbitrary combinations of Conditional Formulae (4) through (14) below to be satisfied.

$$-2.0<R1/H1<-0.5 \quad (4)$$

$$0.8<enP/Bf<1.5 \quad (5)$$

$$-20<fL1a2/fw<-8 \quad (6)$$

$$2.5<H1/D4<6.0 \quad (7)$$

$$1.0<(Im\phi \cdot enP)/(H1 \cdot fw)<2.0 \quad (8)$$

$$|fw/fL1|+|fw/fL2|<0.15 \quad (9)$$

$$L/Im\phi<10 \quad (10)$$

$$1.0<Bf/Im\phi<2.0 \quad (11)$$

$$1.5<Im\phi/fw<4.0 \quad (12)$$

$$4.0<fG2/fw<8.0 \quad (13)$$

$$3.0<fG5a6/fw<6.0 \quad (14)$$

$$FNo.\ max<3.00 \quad (15)$$

wherein R1 is the paraxial radius of curvature of the surface of the first lens toward the magnification side, H1 is the height of a principal light ray at a maximum angle of view on the surface of the first lens toward the magnification side, enP is the distance from the lens surface most toward the magnification side to the position of a magnification side pupil along the optical axis, Bf is an air converted length from the lens surface most toward the reduction side to a reduction side focal point position along the optical axis, fL1a2 is the combined focal length of the first lens and the second lens, fw is the focal length of the entire projection zoom lens at the wide angle lens, D4 is the distance between the second lens and the third lens along the optical axis, Imϕ is the maximum effective image circle diameter at the reduction side, fL1 is the focal length of the first lens, fL2 is the focal length of the second lens, L is the distance from the lens surface most toward the magnification side to the reduction side focal point position along the optical axis in the case that the distance between the lens surface most toward the reduction side to the reduction side focal point position is an air converted distance, fG2 is the focal length of the second lens group, fG5a6 is the combined focal length of the lens group most toward the reduction side from among the plurality of lens groups and the final lens group, and FNo. max is a maximum F number.

The operational effects of Conditional Formulae (4) through (15) above will be described below. By configuring the projection zoom lens such that the value of R1/H1 is not less than or equal to the lower limit defined in Conditional Formula (4), the amount of sag at the peripheral portion of the surface of the first lens L11 toward the magnification side can be prevented from becoming excessively great. As a result, the amount of sag at the peripheral portion of the second lens L12 can be suppressed, while favorably correcting both field curvature and distortion. In addition, deterioration in the formability of the first lens L11 and the second lens L12 can be prevented. By configuring the projection zoom lens such that the value of R1/H1 is not greater than or equal to the upper limit defined in Conditional Formula (4), variation in amounts of sag of the surface of the first lens L11 toward the magnification side from the vicinity of the optical axis to the peripheral portion can be suppressed, and deterioration in formability can be prevented.

It is more preferable for Conditional Formula (4-1) below to be satisfied, and even more preferable for Conditional Formula (4-2) below to be satisfied, in order to cause the above advantageous effects related to Conditional Formula (4) to become more prominent.

$$-1.5 < R1/H1 < -0.7 \quad (4\text{-}1)$$

$$-1.5 < R1/H1 < -0.8 \quad (4\text{-}2)$$

Bf in Conditional Formula (5) is the length of back focus as an air converted distance for a case in which the projection distance is infinity and the reduction side is designated as the back side. By configuring the projection zoom lens such that the value of enP/Bf is not less than or equal to the lower limit defined in Conditional Formula (5), the back focus can be prevented from becoming excessively long, and suppressing an increase in the size of the lens system can be facilitated. By configuring the projection zoom lens such that the value of enP/Bf is not greater than or equal to the upper limit defined in Conditional Formula (5), a necessary amount of back focus can be secured, or it will become possible to prevent the diameter of the first lens L11 from becoming great.

It is more preferable for Conditional Formula (5-1) below to be satisfied, and even more preferable for Conditional Formula (5-2) below to be satisfied, in order to cause the above advantageous effects related to Conditional Formula (5) to become more prominent.

$$0.9 < enP/Bf < 1.2 \quad (5\text{-}1)$$

$$0.9 < enP/Bf < 1.15 \quad (5\text{-}2)$$

By configuring the projection zoom lens such that the value of fL1a2/fw is not less than or equal to the lower limit defined in Conditional Formula (6), the burden of refractive power of the lenses within the first lens group G1 other than the first lens L11 and the second lens L12 can be reduced, and the amount of aberrations which are generated by the lenses within the first lens group G1 other than the first lens L11 and the second lens L12 can be suppressed. By configuring the projection zoom lens such that the value of fL1a2/fw is not greater than or equal to the upper limit defined in Conditional Formula (6), the combined refractive power of the first lens L11 and the second lens L12 can be prevented from becoming great, and movement of the position focused on by the first lens L11 and the second lens L12 can be suppressed when the ambient temperature changes.

It is more preferable for Conditional Formula (6-1) below to be satisfied in order to cause the above advantageous effects related to Conditional Formula (6) to become more prominent.

$$-15 < fL1a2/fw < -10 \quad (6\text{-}1)$$

By configuring the projection zoom lens such that the value of H1/D4 is not less than or equal to the lower limit defined in Conditional Formula (7), the second lens L12 can be prevented from being of a shape with a large amount of sag, and deterioration in the formability thereof can be prevented. By configuring the projection zoom lens such that the value of H1/D4 is not greater than or equal to the upper limit defined in Conditional Formula (7), the outer diameter of the first lens L11 can be prevented from becoming excessively great.

It is more preferable for Conditional Formula (7-1) below to be satisfied in order to cause the above advantageous effects related to Conditional Formula (7) to become more prominent.

$$3.0 < H1/D4 < 5.0 \quad (7\text{-}1)$$

By configuring the projection zoom lens such that the value of (Imϕ·enP)/(H1·fw) is not less than or equal to the lower limit defined in Conditional Formula (8), the amount of sag at the peripheral portion of the surface of the first lens L11 toward the magnification side can be prevented from becoming excessively great. As a result, the amount of sag at the peripheral portion of the second lens L12 can be suppressed, while favorably correcting both field curvature and distortion. In addition, deterioration in the formability of the first lens L11 and the second lens L12 can be prevented. By configuring the projection zoom lens such that the value of (Imϕ·enP)/(H1·fw) is not greater than or equal to the upper limit defined in Conditional Formula (8), variation in amounts of sag of the surface of the first lens L11 toward the magnification side from the vicinity of the optical axis to the peripheral portion can be suppressed, and deterioration in formability can be prevented.

It is more preferable for Conditional Formula (8-1) below to be satisfied, and even more preferable for Conditional Formula (8-2) to be satisfied, in order to cause the above advantageous effects related to Conditional Formula (8) to become more prominent.

$$1.2 < (Im\phi \cdot enP)/(H1 \cdot fw) < 2.0 \quad (8\text{-}1)$$

$$1.5 < (Im\phi \cdot enP)/(H1 \cdot fw) < 2.0 \quad (8\text{-}2)$$

By configuring the projection zoom lens such that the value of fw/|fL1|+fw/|fL2| is not greater than or equal to the upper limit defined in Conditional Formula (9), the individual refractive powers of each of the first lens L11 and the second lens L12 can be prevented from becoming great, and the amount of movement of the individual positions focused on by each of the first lens L11 and the second lens L12 due to changes in ambient temperature can be decreased.

In addition, it is preferable for Conditional Formula (9-1) to be satisfied. The advantageous effects related to the upper limit of Conditional Formula (9-1) are the same as the advantageous effects obtained by satisfying Conditional Formula (9) described above. By configuring the projection zoom lens such that the value of $fw/|fL1|+fw/|fL2|$ is not less than or equal to the lower limit defined in Conditional Formula (9-1), the burden of negative refractive power borne by the third lens L13 can be prevented from becoming excessively great, and the amount of generated aberration can be suppressed.

$$0.05 < fw/|fL1| + fw/|fL2| < 0.15 \tag{9-1}$$

It is even more preferable for Conditional Formula (9-2) to be satisfied, in order to cause the above advantageous effects related to Conditional Formula (9-1) to become more prominent.

$$0.07 < fw/|fL1| + fw/|fL2| < 0.12 \tag{9-2}$$

By configuring the projection zoom lens such that the value of $L/Im\phi$ is not greater than or equal to the upper limit of Conditional Formula (10), it becomes possible to prevent the total length of the lens system from becoming excessively long. It is more preferable for Conditional Formula (10-1) to be satisfied in order to cause the above advantageous effects related to Conditional Formula (10) to become more prominent.

$$L/Im\phi < 8.5 \tag{10-1}$$

In addition, it is preferable for Conditional Formula (10-2) below to be satisfied. The advantageous effects related to the upper limit of Conditional Formula (10-1) are the same as the advantageous effects obtained by satisfying Conditional Formula (10) described above. By configuring the projection zoom lens such that the value of $L/Im\phi$ is not less than or equal to the lower limit defined in Conditional Formula (10-2), it becomes possible to secure the size of a maximum effective image circle which is compatible with the size of the image display surface 1 of the light valve. Further, shift projection, in which the optical axis Z and the center of the image display surface 1 are not aligned, will also be enabled. It is more preferable for Conditional Formula (10-3) to be satisfied in order to cause the above advantageous effects related to Conditional Formula (10-2) to become more prominent.

$$5.0 < L/Im\phi < 10 \tag{10-2}$$

$$6.0 < L/Im\phi < 8.5 \tag{10-3}$$

By configuring the projection zoom lens such that the value of $Bf/Im\phi$ is not less than or equal to the lower limit defined in Conditional Formula (11), back focus of a length necessary for a projection lens can be secured. By configuring the projection zoom lens such that the value of $Bf/Im\phi$ is not greater than or equal to the upper limit defined in Conditional Formula (11), the back focus can be prevented from becoming excessively long, and it becomes possible to suppress an increase in the size of the lens system.

It is more preferable for Conditional Formula (11-1) to be satisfied in order to cause the above advantageous effects related to Conditional Formula (11) to become more prominent.

$$1.2 < Bf/Im\phi < 1.5 \tag{11-1}$$

By configuring the projection zoom lens such that the value of $Im\phi/fw$ is not less than or equal to the lower limit defined in Conditional Formula (12), a wide angle of view can be secured. By configuring the projection zoom lens such that the value of $Im\phi/fw$ is not greater than or equal to the upper limit defined in Conditional Formula (12), the outer diameters of the lenses toward the magnification side can be prevented from becoming excessively large.

It is more preferable for Conditional Formula (12-1) to be satisfied, and even more preferable for Conditional Formula (12-2), in order to cause the above advantageous effects related to Conditional Formula (12) to become more prominent.

$$2.0 < Im\phi/fw < 3.0 \tag{12-1}$$

$$2.2 < Im\phi/fw < 3.0 \tag{12-2}$$

By configuring the projection zoom lens such that the value of $fG2/fw$ is not less than or equal to the lower limit defined in Conditional Formula (13), correction of spherical aberration at the wide angle end will be facilitated. By configuring the projection zoom lens such that the value of $fG2/fw$ is not greater than or equal to the upper limit defined in Conditional Formula (13), the outer diameters of the lenses toward the magnification side can be prevented from becoming excessively large.

It is more preferable for Conditional Formula (13-1) to be satisfied in order to cause the above advantageous effects related to Conditional Formula (13) to become more prominent.

$$5.0 < fG2/fw < 7.0 \tag{13-1}$$

By configuring the projection zoom lens such that the value of $fG5a6/fw$ is not less than or equal to the lower limit defined in Conditional Formula (14), securing a back focus of an appropriate length is facilitated. By configuring the projection zoom lens such that the value of $fG5a6/fw$ is not greater than or equal to the upper limit defined in Conditional Formula (14), the total length of the lens system can be prevented from becoming excessively long, and the outer diameters of the lenses toward the magnification side can be prevented from becoming excessively large.

It is more preferable for Conditional Formula (14-1) to be satisfied in order to cause the above advantageous effects related to Conditional Formula (14) to become more prominent.

$$4.0 < fG5a6/fw < 5.0 \tag{14-1}$$

By configuring the projection zoom lens such that the value of FNo. max is not greater than or equal to the upper limit defined in Conditional Formula (15), an F number necessary for a projection lens can be secured within the entire magnification range, including at the telephoto end. It is more preferable for Conditional Formula (15-1) to be satisfied in order to cause the above advantageous effects related to Conditional Formula (15) to become more prominent.

$$FNo. \text{ max} < 2.50 \tag{15-1}$$

In addition, it is preferable for Conditional Formula (15-2) below to be satisfied. The advantageous effects related to the upper limit of Conditional Formula (15-1) are the same as the advantageous effects obtained by satisfying Conditional Formula (15) described above. By configuring the projection zoom lens such that the value of FNo. max is not less than or equal to the lower limit defined in Conditional Formula (15-2), it becomes possible to achieve a degree of performance desired for a projection zoom lens while suppressing an increase in the size of the lens system, without a significant increase in cost. It is more preferable for Conditional Formula (15-3) to be satisfied, in view of these circumstances.

$$1.5 < FNo. \ max < 3.00 \quad (15\text{-}2)$$

$$1.5 < FNo. \ max < 2.50 \quad (15\text{-}3)$$

In addition, it is preferable for the projection zoom lens of the present embodiment to be configured such that it is telecentric at the reduction side. In this case, the projection zoom lens will be favorable for use in a projection type display device in which a cross prism, a total reflecting prism, and the like are provided between the lens system and the image display surface 1.

In addition, it is preferable for the angles formed by angular bisecting lines of the upper maximum light ray and the lower maximum light ray of the cross sections of light beams which are focused on arbitrary points on an imaging plane at the reduction side and the principal light ray of the light beams to be within a range from −3° to +3°, in order to suppress losses in illuminating light and to take illuminating light into the projection zoom lens.

In addition, it is preferable for distortion to be suppressed such that it is within a range from −2% to +2% throughout the entire zoom range in the projection zoom lens of the present disclosure.

Next, preferred configurations for each lens group will be described with reference to the example illustrated in FIG. 1. It is preferable for the first lens group G1 to essentially consist of, in order from the magnification side to the reduction side, a negative lens having a concave surface toward the magnification side, a lens having a convex surface toward the magnification side, a negative lens having a concave surface toward the reduction side, a biconcave lens, and a cemented lens formed by cementing a positive lens and a negative lens together. By distributing the negative refractive power of the first lens group G1 among at least four lenses, the generation of distortion can be suppressed. Configuring the second lens from the magnification side within the first lens group G1 to have a convex surface toward the magnification side is advantageous from the viewpoint of correcting distortion at low angles of view. Longitudinal chromatic aberration and lateral chromatic aberration which are generated by the first lens group G1 can be corrected, by providing the cemented lens formed by cementing a positive lens and a negative lens together most toward the reduction side within the first lens group G1.

It is preferable for the first lens group G1 to have at least one positive lens. In this case, lateral chromatic aberration and distortion can be favorably corrected. In addition, such a configuration is advantageous from the viewpoint of widening the angle of view.

In addition, it is preferable for the lens surface most toward the magnification side within the first lens group G1 to be of an aspherical shape having a concave surface toward the magnification side in the paraxial region, a region at which the negative refractive power becomes weaker than that in the paraxial region toward the exterior of the paraxial region in the radial direction, and an inflection point within the effective diameter thereof. In this case, the generation of negative distortion that accompanies a widening of the angle of view can be suppressed. Note that the effective diameter refers to the diameter of a circle formed by points most toward the exterior (points farthest from the optical axis) from among points at which light rays that contribute to image formation intersect with the surface of the lens. In addition, an aspherical shape having an inflection point is an aspherical shape having a point at which the cross sectional shape of the lens that includes the optical axis changes from a concave shape to a convex shape (or from a convex shape to a concave shape).

The first lens group G1 of the example illustrated in FIG. 1 consists of, in order from the magnification side to the reduction side, a first lens L11 having a negative meniscus shape with a concave surface toward the magnification side in the paraxial region, a second lens L12 having a positive meniscus shape with a convex surface toward the magnification side in the paraxial region, a third lens L13 having a negative meniscus shape with a convex surface toward the magnification side, a biconcave lens L14, a positive lens L15, and a negative lens L16. The lens L15 and the lens L16 are cemented together. However, the cemented lens provided most toward the reduction side within the first lens group G1 is not limited to that of the example illustrated in FIG. 1, and a configuration in which a negative lens and a positive lens, provided in this order from the magnification side, are cemented together is also possible.

In the case that the first lens group G1 consists of six lenses, when the projection distance changes, the first through third lenses from the magnification side may be moved integrally in the direction of the optical axis, or the fourth through sixth lenses from the magnification side may be moved integrally in the direction of the optical axis to perform focusing when the projection distance changes. Alternatively, a group consisting of the first through third lenses from the magnification side within the first lens group G1 may be designated as a front group, a group consisting of the fourth through sixth lenses from the magnification side within the first lens group G1 may be designated as a rear group, and the front and rear groups may be moved along different trajectories in the direction of the optical axis to perform focusing operations. In this case, fluctuations in aberrations during focusing operations can be suppressed to a greater degree.

The second lens group G2 may essentially consist of a single biconvex lens. In this case, such a configuration is advantageous from the viewpoints of miniaturization and weight reduction. The second lens group G2 of the example illustrated in FIG. 1 consists only of a biconvex lens L21.

It is preferable for the third lens group G3 to essentially consist of, in order from the magnification side to the reduction side, a positive lens having a convex surface toward the magnification side and a negative lens having a concave surface toward the magnification side. In this case, axial aberrations and off axis aberrations can be corrected with favorable balance. The third lens group G3 of the example illustrated in FIG. 1 consists of a lens L31 and a lens L32 having the above preferable configuration. Note that the third lens group G3 may be a lens group having a negative refractive power as in the example illustrated in FIG. 1, or may be a lens group having a positive refractive power as in Example 3 to be described later.

The fourth lens group G4 may be a lens group having a positive refractive power. In this case, the fourth lens group may essentially consist of a single positive lens. Such a configuration is advantageous from the viewpoints of miniaturization and weight reduction. The fourth lens group G4 of the example illustrated in FIG. 1 consists only of a biconvex lens L41.

The fifth lens group G5 is configured to have at least one negative lens. Thereby, fluctuations in lateral chromatic aberration while changing magnification can be cancelled, while longitudinal chromatic aberration can be favorably corrected throughout the entire zoom range. The fifth lens group G5 may be a lens group having a positive refractive power, for example.

The fifth lens group G5 of the example illustrated in FIG. 1 consists of, in order from the magnification side to the reduction side, a negative lens L51, a positive lens L52, a negative lens L53, a negative lens L54, a positive lens L55, and a positive lens L56. The lens L52 and the lens L53 are cemented together, and the lens L54 and the lens L55 are cemented together.

The final lens group may be a lens group having a positive refractive power, for example. In this case, the final lens group may essentially consist of a single positive lens. Such a configuration is advantageous from the viewpoints of miniaturization and weight reduction. The sixth lens group G6 of the example illustrated in FIG. 1 is constituted only by a biconvex lens L61.

In addition, the projection zoom lens of FIG. 1 is configured such that the distance between the first lens group G1 and the second lens group G2 is shorter at the telephoto end than at the wide angle end, the distance between the second lens group G2 and the third lens group G3 is longer at the telephoto end than at the wide angle end, the distance between the third lens group G3 and the fourth lens group G4 is shorter at the telephoto end than at the wide angle end, the distance between the fourth lens group G4 and the fifth lens group G5 is longer at the telephoto end than at the wide angle end, and the distance between the fifth lens group G5 and the sixth lens group G6 is longer at the telephoto end than at the wide angle end.

By the distance between the first lens group G1 and the second lens group G2 being shorter at the telephoto end than at the wide angle end, the angular magnification of an optical system formed by a combination of the first lens group G1 and the second lens group G2 can be increased, which is advantageous from the viewpoint of configuring a variable magnification optical system. By the distance between the second lens group G2 and the third lens group G3 being longer at the telephoto end than at the wide angle end, the distance between the second lens group G2 and the third lens group G3 can be shorter at the wide angle end, the amount of variation in the height of a principal light ray at a maximum angle of view due to changes in magnification can be decreased. In addition, variations in distortion and lateral chromatic aberration when changing magnification can also be suppressed.

By the distance between the third lens group G3 and the fourth lens group G4 being shorter at the telephoto end than at the wide angle end, variation in the telecentric properties at the reduction side when changing magnification can be suppressed. In addition, such a configuration is advantageous from the viewpoint of correcting variations in the position of the imaging plane when changing magnification. By the distance between the fourth lens group G4 and the fifth lens group G5 being longer at the telephoto end than at the wide angle end, variations in lateral chromatic aberration when changing magnification can be suppressed. By the distance between the fifth lens group G5 and the sixth lens group G6 being longer at the telephoto end than at the wide angle end, variations in lateral chromatic aberration when changing magnification can be suppressed.

The movements of each lens group of the projection zoom lens when changing magnification in the example illustrated in FIG. 1 are as follows, for example. That is, in the example illustrated in FIG. 1, the first lens group G1 and the sixth lens group G6 are fixed, the second lens group G2 through the fifth lens group G5 all constantly move toward the magnification side, the distance between the first lens group G1 and the second lens group G2 constantly decreases, the distance between the second lens group G2 and the third lens group G3 constantly increases, the distance between the third lens group G3 and the fourth lens group G4 constantly decreases, the distance between the fourth lens group G4 and the fifth lens group G5 constantly increases, and the distance between the fifth lens group G5 and the sixth lens group G6 constantly increases, when changing magnification from the wide angle end to the telephoto end. However, in the present disclosure, the movements of each lens group when changing magnification may differ from those of the example illustrated in FIG. 1.

Note that it is possible to adopt arbitrary combinations of the preferable configurations and the possible configurations described above. It is preferable for the configurations described above to be selectively adopted as appropriate, according to items desired of the projection zoom lens.

Next, specific examples of the projection zoom lens of the present disclosure will be described. Note that the numerical value data of the examples to be indicated hereinbelow are those which are normalized such that the focal length of the entire lens system at the wide angle end when the projection distance is infinity will be 10.00, and are rounded off at a predetermined number of digits.

Example 1

The lens configuration of a projection zoom lens of Example 1 is illustrated in FIG. 1. Because a description has already been given regarding FIG. 1, redundant descriptions will be omitted here. Numerical value data that indicate the detailed configuration of the projection zoom lens of Example 1 are shown in Table 1 through Table 3. Table 1 shows basic lens data, Table 2 shows aspherical surface coefficients, and Table 3 shows items related to the d line as well as the values of variable distances among surfaces.

In Table 1, ith (i=1, 2, 3, . . . ) lens surface numbers that sequentially increase from the magnification side to the reduction side, with the lens surface at the most magnification side designated as first, are shown in the column Si. The radii of curvature of ith surfaces are shown in the column Ri, the distances between an ith surface and an i+1st surface along the optical axis Z are shown in the column Di. The refractive indices of jth (j=1, 2, 3, . . . ) constituent elements that sequentially increase from the magnification side to the reduction side, with the constituent element at the most magnification side designated as first, with respect to the d line (wavelength: 587.6 nm) are shown in the column Ndj. The Abbe's numbers of the jth constituent elements with respect to the d line are shown in the column vdj.

Note that the signs of the radii of curvature are positive in cases that the surface shape is convex toward the magnification side, and negative in cases that the surface shape is convex toward the reduction side. The glass block 2 is also shown in the basic lens data. An "s" is indicated along with the surface numbers of aspherical surfaces, and numerical values related to the paraxial radii of curvature are shown in the column that shows the radii of curvature for the aspherical surfaces.

Table 2 shows the aspherical surface coefficients of each aspherical surface of Example 1. In the numerical values shown as the aspherical surface data, the symbol "E-n" (n is an integer) means "·10$^{-n}$". The aspherical surface coefficients are the coefficients KA and Am (m is an integer 3 or greater, and differs for each aspherical surface) represented by the aspherical surface shape formula below.

$$Zd = \frac{C \times h^2}{1 + \sqrt{1 - KA \times C^2 \times h^2}} + \sum_m Am \times h^m$$

wherein: Zd is the depth of the aspherical surface (the length of a normal line from a point on an aspherical surface at a height h to a plane perpendicular to the optical axis that contacts the peak of the aspherical surface), h is the height (the distance from the optical axis to the surface of the lens), C is the paraxial curvature, and KA and Am are aspherical surface coefficients.

In Table 1, the variable distances between surfaces are represented by the notation "DD[ ]". The surface number toward the magnification side is shown in the brackets [ ], and written in the column Di. DD[6] is a variable distance between surfaces that changes during focusing operations. DD[11], DD[13], DD[17], DD[19], and DD[29] are the distance between the first lens group G1 and the second lens group G2, the distance between the second lens group G2 and the third lens group G3, the distance between the third lens group G3 and the fourth lens group G4, the distance between the fourth lens group G4 and the fifth lens group G5, and the distance between the fifth lens group G5 and the sixth lens group G6, respectively. All of the distances DD[11], DD[13], DD[17], DD[19], and DD[29] change when changing magnification.

Table 3 shows the values of zoom ratios Zr, the focal length f' of the entire system, the back focus Bf' in the case that the reduction side is designated as the back side as an air converted distance, the F number FNo., the full angle of view 2ω (units are degrees), and the aforementioned variable distances between surfaces at the wide angle end and at the telephoto end. Table 3 shows the above values at the wide angle end and at the telephoto end under the columns WIDE and TELE, respectively. In addition, Table 3 shows the values of Bf' and f' only for cases in which the projection distance is infinity, and the values of the other items are shown for cases in which the projection distance is infinity and for cases in which the projection distance is 2300. Note that the values shown in Table 3 are related to the d line. Here, the projection distance is the distance from the surface of the projection zoom lens most toward the magnification side to a projection surface (screen).

TABLE 1

| | Example 1 | | | |
|---|---|---|---|---|
| Si | Ri | Di | Ndj | vdj |
| *1 | −44.025 | 6.38 | 1.49100 | 57.56 |
| *2 | −285.080 | 2.41 | | |
| *3 | 85.961 | 5.40 | 1.49100 | 57.56 |
| *4 | 102.484 | 11.70 | | |
| 5 | 1131.589 | 2.45 | 1.79952 | 42.22 |
| 6 | 26.255 | DD[6] | | |
| 7 | −77.802 | 3.78 | 1.58913 | 61.14 |
| 8 | 66.732 | 7.53 | | |
| 9 | 356.450 | 8.84 | 1.56732 | 42.82 |
| 10 | −50.682 | 2.45 | 1.58913 | 61.14 |
| 11 | 5416.085 | DD[11] | | |
| 12 | 87.369 | 7.85 | 1.80400 | 46.58 |
| 13 | −102.642 | DD[13] | | |
| 14 | 87.817 | 4.91 | 1.80610 | 33.27 |
| 15 | 1169.347 | 3.81 | | |
| 16 | −66.046 | 1.52 | 1.80100 | 34.97 |
| 17 | −313.068 | DD[17] | | |
| 18 | 47.031 | 5.75 | 1.49700 | 81.54 |
| 19 | −190.027 | DD[19] | | |
| *20 | 60.210 | 1.57 | 1.80610 | 40.92 |
| *21 | 24.011 | 1.47 | | |
| 22 | 32.973 | 11.09 | 1.49700 | 81.54 |
| 23 | −15.246 | 1.96 | 1.80400 | 46.58 |
| 24 | −77.177 | 0.98 | | |
| 25 | −84.374 | 2.51 | 1.80400 | 46.58 |
| 26 | 40.702 | 6.16 | 1.49700 | 81.54 |
| 27 | −44.575 | 0.30 | | |
| 28 | 81.957 | 9.47 | 1.49700 | 81.54 |
| 29 | −34.957 | DD[29] | | |
| 30 | 242.927 | 5.89 | 1.57099 | 50.80 |
| 31 | −64.391 | 17.18 | | |
| 32 | ∞ | 24.54 | 1.51633 | 64.14 |
| 33 | ∞ | | | |

TABLE 2

| | Example 1 | | | |
|---|---|---|---|---|
| | Surface Number | | | |
| | 1 | 2 | 3 | 4 |
| KA | −1.1511294E+00 | 2.8359080E+01 | 7.6175218E−01 | 5.5791439E+00 |
| A3 | 1.1408865E−17 | −1.0335665E−17 | 1.7394640E−19 | 6.8737395E−20 |
| A4 | 2.5932106E−05 | 3.9913358E−05 | 2.7909455E−05 | 1.9531778E−05 |
| A5 | 3.7859886E−06 | 4.1167138E−06 | 3.5962453E−06 | 2.1584711E−06 |
| A6 | −5.4041740E−07 | −4.4390950E−07 | −2.7409973E−07 | −1.5376847E−07 |
| A7 | 2.9006908E−08 | 1.0718728E−08 | −1.0509789E−08 | −1.3644595E−08 |
| A8 | −8.3970634E−10 | −1.5876735E−10 | 8.8694157E−10 | 9.7400545E−10 |
| A9 | 1.2357940E−11 | 1.5097045E−11 | 9.1135123E−12 | 2.5126028E−11 |
| A10 | 3.6101027E−15 | −5.4058651E−13 | −1.4267662E−12 | −2.5394194E−12 |
| A11 | −4.1094485E−15 | −3.4758860E−16 | 5.0578452E−15 | −9.9343932E−15 |
| A12 | 8.8857803E−17 | 2.7801389E−16 | 1.2241630E−15 | 3.2128011E−15 |
| A13 | −9.7408533E−19 | −1.6510974E−18 | −1.3894452E−17 | −1.8613632E−17 |
| A14 | 5.4647838E−21 | −8.0858106E−20 | −5.3516198E−19 | −1.9825199E−18 |
| A15 | −9.6378263E−25 | 7.5458807E−22 | 8.6677171E−21 | 2.1155673E−20 |
| A16 | −2.6799893E−25 | 1.1236040E−23 | 9.3713835E−23 | 4.8035222E−22 |
| A17 | 1.9033741E−27 | −1.3490795E−25 | −1.8220479E−24 | −6.3528755E−24 |

TABLE 2-continued

Example 1

| | Surface Number | |
|---|---|---|
| | 20 | 21 |
| KA | 1.0000000E+00 | 1.0000000E+00 |
| A4 | −3.1339207E−06 | −6.9940057E−06 |
| A6 | −6.5823280E−09 | −2.8385450E−08 |
| A8 | 2.3976406E−10 | 2.1861933E−10 |
| A10 | −5.3725834E−14 | 4.5565083E−14 |
| A12 | −1.2142973E−15 | −1.7339414E−15 |
| A14 | −2.6242020E−21 | −3.1230212E−18 |
| A16 | 1.3552174E−24 | 9.7298511E−26 |
| A18 | 5.8724401E−30 | −1.5936287E−29 |

TABLE 3

Example 1

| | Projection Distance = ∞ | | Projection Distance = 2300 | |
|---|---|---|---|---|
| | WIDE | TELE | WIDE | TELE |
| Zr | 1.0 | 1.25 | 1.0 | 1.25 |
| f | 10.00 | 12.50 | | |
| Bf | 33.37 | 33.37 | | |
| FNo. | 1.90 | 2.13 | 1.90 | 2.13 |
| 2ω[°] | 102.4 | 89.4 | 101.6 | 88.6 |
| DD[6] | 20.36 | 20.36 | 18.86 | 18.86 |
| DD[11] | 14.41 | 6.15 | 14.99 | 6.72 |
| DD[13] | 19.39 | 26.08 | 19.39 | 26.08 |
| DD[17] | 19.19 | 2.25 | 19.19 | 2.25 |
| DD[19] | 8.13 | 18.77 | 8.13 | 18.77 |
| DD[29] | 0.29 | 8.17 | 0.29 | 8.17 |

The spherical aberration, the astigmatism, the distortion, the lateral chromatic aberration (chromatic aberration of magnification rates) for a case in which the projection distance is 2300 are illustrated in aberration diagrams in order from the left to the right of FIG. 9. Aberrations in a state in which the projection zoom lens is at the wide angle end are illustrated in the upper half of FIG. 9 labeled WIDE, and aberrations in a state in which the projection zoom lens is at the telephoto end are illustrated in the lower half of FIG. 9 labeled TELE. In the diagram that illustrates spherical aberration in FIG. 9, aberrations related to the d line (wavelength: 587.6 nm), the C line (wavelength: 656.3 nm), and the F line (wavelength: 486.1 nm) are indicated by a solid line, a long broken line, and a short broken line, respectively. In the diagram that illustrates astigmatism, aberrations related to the d line in the sagittal direction and the tangential direction are indicated by a solid line and a broken line, respectively. In the diagram that illustrates distortion, aberration related to the d line is indicated by a solid line. In the diagram that illustrates lateral chromatic aberration, aberrations related to the C line and the F line are indicated by a long broken line and a short broken line, respectively. In the diagram that illustrates spherical aberration, "FNo." denotes the F number, and in the diagrams that illustrate other aberrations, "ω" denotes half angles of view.

The symbols, the meanings, and the manners in which the various pieces of data are described in the description of Example 1 above are the same for the examples to be described below unless otherwise noted. Therefore, the redundant portions will be omitted from the following descriptions of the other examples.

Example 2

The lens configuration of the projection zoom lens of Example 2 is illustrated in FIG. 2. Note that the movements of each lens group of the projection zoom lens when changing magnification in the example illustrated in FIG. 2 are as follows. That is, the first lens group G1 and the sixth lens group G6 are fixed, the second lens group G2, the fourth lens group G4, and the fifth lens group G5 all constantly move toward the magnification side, and the third lens group G3 moves toward the magnification side and then toward the reduction side, when changing magnification from the wide angle end to the telephoto end. The distance between the first lens group G1 and the second lens group G2 constantly decreases, the distance between the fourth lens group G4 and the fifth lens group G5 constantly increases, and the distance between the fifth lens group G5 and the sixth lens group G6 constantly increases, when changing magnification from the wide angle end to the telephoto end. The position of the third lens group G3 at the telephoto end is more toward the reduction side compared to the position of the third lens group G3 at the wide angle end.

Figure 10:
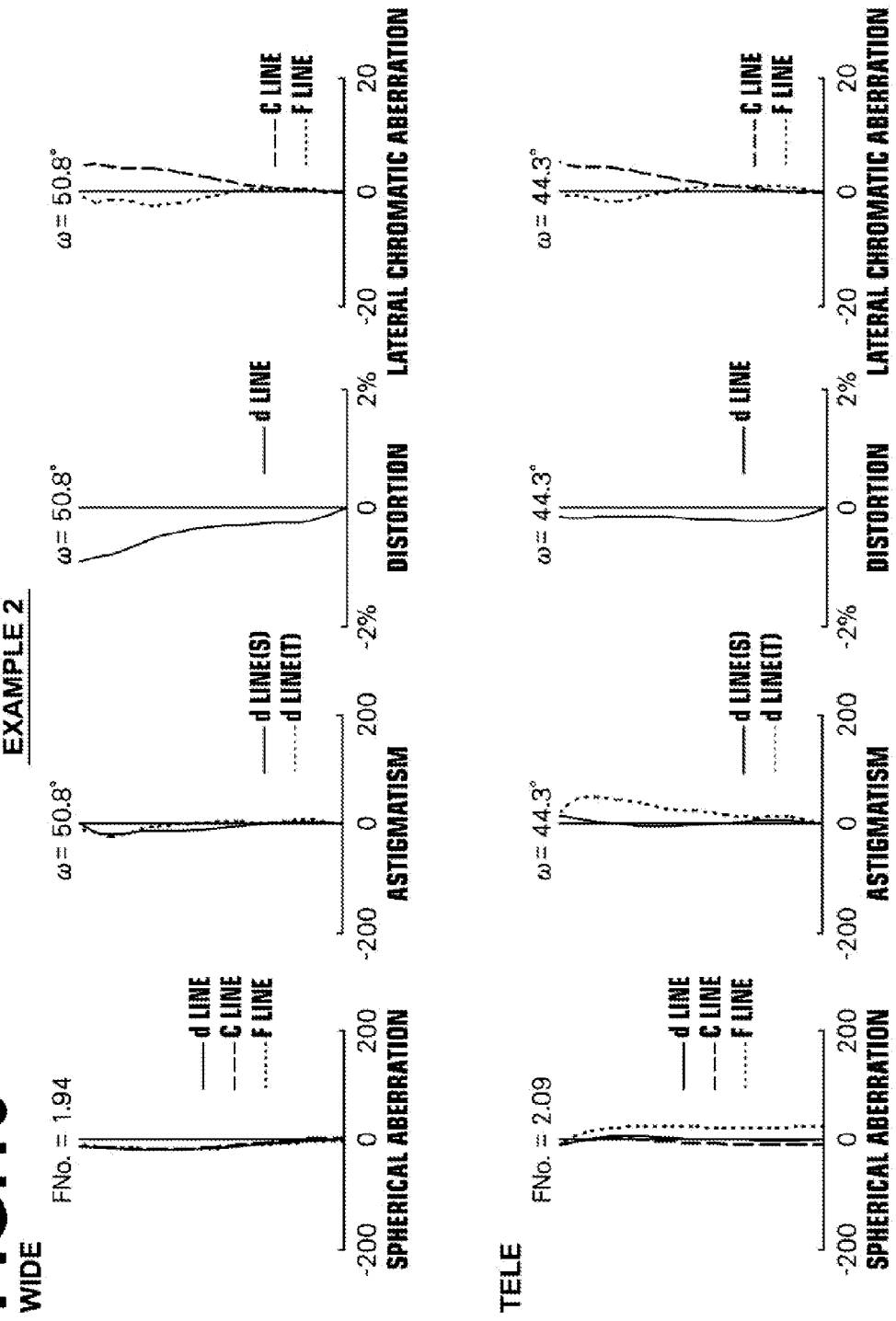
FIG. 10 is a collection of diagrams that illustrate aberrations of the projection zoom lens according to Example 2, the diagrams illustrating spherical aberration, astigmatism, distortion, and lateral chromatic aberrations in this order from the left side of the drawing sheet.

Basic lens data are shown in Table 4, aspherical surface coefficients are shown in Table 5, and the values of various items and the variable distances between surfaces are shown in Table 6 for the projection zoom lens of Example 2. The spherical aberration, the astigmatism, the distortion, the lateral chromatic aberration of the projection zoom lens of Example 2 for a case in which the projection distance is 2300 are illustrated in aberration diagrams in order from the left to the right of FIG. 10.

TABLE 4

Example 2

| Si | Ri | Di | Ndj | νdj |
|---|---|---|---|---|
| *1 | −44.275 | 6.41 | 1.49100 | 57.56 |
| *2 | −276.344 | 1.57 | | |
| *3 | 88.102 | 5.42 | 1.49100 | 57.56 |
| *4 | 99.424 | 10.84 | | |
| 5 | 1160.204 | 2.47 | 1.79952 | 42.22 |
| 6 | 26.304 | DD[6] | | |
| 7 | −66.469 | 2.69 | 1.58913 | 61.14 |
| 8 | 61.077 | 5.29 | | |
| 9 | 256.911 | 8.89 | 1.56732 | 42.82 |
| 10 | −39.362 | 2.00 | 1.58913 | 61.14 |
| 11 | −442.745 | DD[11] | | |
| 12 | 83.870 | 7.89 | 1.80400 | 46.58 |
| 13 | −92.422 | DD[13] | | |
| 14 | 96.265 | 4.97 | 1.80610 | 33.27 |
| 15 | 958.487 | 1.69 | | |
| 16 | −62.914 | 1.75 | 1.80100 | 34.97 |
| 17 | −213.964 | DD[17] | | |
| 18 | 40.936 | 5.15 | 1.49700 | 81.54 |
| 19 | −495.641 | DD[19] | | |
| *20 | 68.808 | 2.27 | 1.80610 | 40.92 |
| *21 | 23.273 | 2.07 | | |
| 22 | 35.368 | 9.21 | 1.49700 | 81.54 |

TABLE 4-continued

Example 2

| Si | Ri | Di | Ndj | vdj |
|---|---|---|---|---|
| 23 | −14.852 | 1.97 | 1.80400 | 46.58 |
| 24 | −69.125 | 0.99 | | |
| 25 | −113.858 | 2.48 | 1.80400 | 46.58 |
| 26 | 41.049 | 6.03 | 1.49700 | 81.54 |
| 27 | −48.909 | 0.30 | | |
| 28 | 84.972 | 7.95 | 1.49700 | 81.54 |
| 29 | −33.154 | DD[29] | | |
| 30 | 165.433 | 5.92 | 1.57099 | 50.80 |
| 31 | −64.996 | 17.24 | | |
| 32 | ∞ | 24.66 | 1.51633 | 64.14 |
| 33 | ∞ | | | |

TABLE 5

Example 2

Surface Number

| | 1 | 2 | 3 | 4 |
|---|---|---|---|---|
| KA | −1.1102790E+00 | 2.0377050E+01 | 1.9234933E+00 | 9.9174038E+00 |
| A3 | 1.2599713E−18 | −1.4915179E−17 | 8.4586941E−20 | −4.2796273E−20 |
| A4 | 2.6833652E−05 | 4.5179764E−05 | 3.2153415E−05 | 2.2044009E−05 |
| A5 | 3.8491015E−06 | 4.1300139E−06 | 2.9643847E−06 | 4.7948047E−07 |
| A6 | −5.5587130E−07 | −4.7748255E−07 | −2.8514935E−07 | −6.6554511E−08 |
| A7 | 2.9831934E−08 | 1.0792618E−08 | −7.9321191E−09 | −8.6984369E−09 |
| A8 | −8.5914503E−10 | −8.8147359E−11 | 8.8250375E−10 | 5.3498973E−10 |
| A9 | 1.2695541E−11 | 1.4941530E−11 | 4.2855178E−12 | 2.2389406E−11 |
| A10 | −2.9314578E−15 | −6.3040351E−13 | −1.3715922E−12 | −1.6015022E−12 |
| A11 | −4.1895024E−15 | 2.8323249E−16 | 9.6404206E−15 | −2.1607517E−14 |
| A12 | 9.6478444E−17 | 3.3625822E−16 | 1.1434322E−15 | 2.2234094E−15 |
| A13 | −1.0687711E−18 | −2.2505823E−18 | −1.5938650E−17 | 4.4523777E−18 |
| A14 | 4.6917128E−21 | −1.0043948E−19 | −4.8733654E−19 | −1.4810549E−18 |
| A15 | 1.3092801E−23 | 1.0035733E−21 | 8.9193543E−21 | 4.7923491E−21 |
| A16 | −1.6915920E−25 | 1.3907457E−23 | 8.3369632E−23 | 3.8427065E−22 |
| A17 | 4.4287842E−28 | −1.7373829E−25 | −1.7713772E−24 | −2.1633447E−24 |

Surface Number

| | 20 | 21 |
|---|---|---|
| KA | 1.0000000E+00 | 1.0000000E+00 |
| A4 | −3.0909288E−06 | −6.8980602E−06 |
| A6 | −6.4325207E−09 | −2.7739425E−08 |
| A8 | 2.3215947E−10 | 2.1168539E−10 |
| A10 | −5.1544956E−14 | 4.3715471E−14 |
| A12 | −1.1543266E−15 | −1.6483070E−15 |
| A14 | −2.4717332E−21 | −2.9415705E−18 |
| A16 | 1.2647771E−24 | 9.0805299E−26 |
| A18 | 5.4303055E−30 | −1.4736448E−29 |

TABLE 6

Example 2

| | Projection Distance = ∞ | | Projection Distance = 2300 | |
|---|---|---|---|---|
| | WIDE | TELE | WIDE | TELE |
| Zr | 1.0 | 1.25 | 1.0 | 1.25 |
| f | 10.00 | 12.50 | | |
| Bf | 33.51 | 33.51 | | |
| FNo. | 1.94 | 2.09 | 1.94 | 2.09 |
| 2ω[°] | 102.6 | 89.6 | 101.6 | 88.6 |
| DD[6] | 19.97 | 19.97 | 18.00 | 18.00 |
| DD[11] | 13.82 | 6.22 | 14.59 | 6.99 |
| DD[13] | 17.62 | 25.50 | 17.62 | 25.50 |
| DD[17] | 21.59 | 3.14 | 21.59 | 3.14 |
| DD[19] | 8.06 | 18.35 | 8.06 | 18.35 |
| DD[29] | 0.30 | 8.18 | 0.30 | 8.18 |

Example 3

The lens configuration of the projection zoom lens of Example 3 is illustrated in FIG. 3. In the projection zoom lens of Example 3, the movements of each lens group of the projection zoom lens when changing magnification from the wide angle end to the telephoto end are substantially the same as those of Example 2 described above. However, the projection zoom lens of Example 3 differs from Example 2 in that the position of the third lens group G3 at the telephoto end is more toward the magnification side compared to the position of the third lens group G3 at the wide angle end.

Basic lens data are shown in Table 7, aspherical surface coefficients are shown in Table 8, and the values of various items and the variable distances between surfaces are shown in Table 9 for the projection zoom lens of Example 3. The spherical aberration, the astigmatism, the distortion, the lateral chromatic aberration of the projection zoom lens of Example 3 for a case in which the projection distance is 2300 are illustrated in aberration diagrams in order from the left to the right of FIG. 11.

TABLE 7

Example 3

| Si | Ri | Di | Ndj | vdj |
|---|---|---|---|---|
| *1 | −49.046 | 6.63 | 1.49100 | 57.56 |
| *2 | −348.660 | 2.47 | | |

TABLE 7-continued

Example 3

| Si | Ri | Di | Ndj | vdj |
|---|---|---|---|---|
| *3 | 94.350 | 5.52 | 1.49100 | 57.56 |
| *4 | 101.667 | 14.36 | | |
| 5 | 21660.324 | 2.51 | 1.78590 | 44.20 |
| 6 | 28.662 | DD[6] | | |
| 7 | −84.476 | 2.51 | 1.58913 | 61.14 |
| 8 | 74.915 | 12.12 | | |
| 9 | 1340.477 | 2.42 | 1.62041 | 60.29 |
| 10 | 66.919 | 9.39 | 1.51742 | 52.43 |
| 11 | −355.755 | DD[11] | | |
| 12 | 94.469 | 8.03 | 1.80400 | 46.58 |
| 13 | −112.235 | DD[13] | | |
| 14 | 93.600 | 5.10 | 1.73800 | 32.26 |
| 15 | 1310.118 | 4.02 | | |
| 16 | −70.197 | 1.51 | 1.72047 | 34.71 |
| 17 | −255.671 | DD[17] | | |
| 18 | 49.182 | 4.68 | 1.49700 | 81.54 |
| 19 | −270.234 | DD[19] | | |
| *20 | 59.621 | 1.68 | 1.80610 | 40.92 |
| *21 | 24.896 | 1.78 | | |
| 22 | 35.306 | 10.19 | 1.49700 | 81.54 |
| 23 | −15.826 | 2.01 | 1.80400 | 46.58 |
| 24 | −80.598 | 1.00 | | |
| 25 | −69.220 | 2.52 | 1.79952 | 42.22 |
| 26 | 41.159 | 6.64 | 1.49700 | 81.54 |
| 27 | −45.031 | 0.30 | | |
| 28 | 85.205 | 8.04 | 1.49700 | 81.54 |
| 29 | −35.537 | DD[29] | | |
| 30 | 197.695 | 6.02 | 1.58267 | 46.42 |
| 31 | −68.501 | 17.20 | | |
| 32 | ∞ | 25.11 | 1.51633 | 64.14 |
| 33 | ∞ | | | |

TABLE 8

Example 3

Surface Number

| | 1 | 2 | 3 | 4 |
|---|---|---|---|---|
| KA | −1.1947819E+00 | 2.4261754E+01 | 2.3078586E+00 | −1.1665785E+01 |
| A3 | 7.3342438E−18 | 1.1387367E−17 | −5.7977501E−20 | 7.7369870E−20 |
| A4 | 2.0552582E−05 | 3.5970828E−05 | 3.6731751E−05 | 2.7351779E−05 |
| A5 | 2.4995170E−06 | 2.1886571E−06 | 1.4610520E−06 | 1.2625028E−06 |
| A6 | −3.2360418E−07 | −2.4132488E−07 | −1.8375089E−07 | −1.5006075E−07 |
| A7 | 1.5383108E−08 | 4.6817539E−09 | −3.1670078E−09 | −6.4215327E−09 |
| A8 | −3.9287269E−10 | −1.6907311E−11 | 3.9590892E−10 | 6.1385799E−10 |
| A9 | 5.1946552E−12 | 4.1924161E−12 | 1.3363423E−12 | 8.3468376E−12 |
| A10 | −2.2290306E−15 | −1.7189297E−13 | −4.5044975E−13 | −1.2038421E−12 |
| A11 | −1.3550123E−15 | 2.9592857E−16 | 2.3364064E−15 | 8.7054545E−16 |
| A12 | 2.8545627E−17 | 6.6579111E−17 | 2.8047952E−16 | 1.1977959E−15 |
| A13 | −2.9055895E−19 | −4.5304405E−19 | −2.9693435E−18 | −9.4900026E−18 |
| A14 | 1.1890100E−21 | −1.4438207E−20 | −9.0197905E−19 | −5.9119376E−19 |
| A15 | 3.2824169E−24 | 1.3632477E−22 | 1.2740629E−21 | 6.9503149E−21 |
| A16 | −4.3204888E−26 | 1.4649829E−24 | 1.1710529E−23 | 1.1551196E−22 |
| A17 | 1.0824990E−28 | −1.6703812E−26 | −1.9364430E−25 | −1.5959462E−24 |

Surface Number

| | 20 | 21 |
|---|---|---|
| KA | 1.0000000E+00 | 1.0000000E+00 |
| A4 | −2.9272496E−06 | −6.5327756E−06 |
| A6 | −5.8748817E−09 | −2.5334678E−08 |
| A8 | 2.0448032E−10 | 1.8644726E−10 |
| A10 | −4.3782289E−14 | 3.7131924E−14 |
| A12 | −9.4555798E−16 | −1.3501983E−15 |
| A14 | −1.9525773E−21 | −2.3237313E−18 |
| A16 | 9.6353568E−25 | 6.9177523E−26 |
| A18 | 3.9895623E−30 | −1.0826643E−29 |

TABLE 9

Example 3

| | Projection Distance = ∞ | | Projection Distance = 2300 | |
|---|---|---|---|---|
| | WIDE | TELE | WIDE | TELE |
| Zr | 1.0 | 1.25 | 1.0 | 1.25 |
| f | 10.00 | 12.50 | | |
| Bf | 33.76 | 33.76 | | |
| FNo. | 1.89 | 2.03 | 1.89 | 2.03 |
| 2ω[°] | 105.8 | 93.0 | 104.0 | 90.8 |
| DD[6] | 24.30 | 24.30 | 19.79 | 19.79 |
| DD[11] | 14.93 | 4.69 | 16.52 | 6.28 |
| DD[13] | 17.69 | 26.70 | 17.69 | 26.70 |
| DD[17] | 22.02 | 4.15 | 22.02 | 4.15 |
| DD[19] | 8.95 | 20.51 | 8.95 | 20.51 |
| DD[29] | 0.30 | 7.84 | 0.30 | 7.84 |

Example 4

The lens configuration of the projection zoom lens of Example 4 is illustrated in FIG. 4. In the projection zoom lens of Example 4, the movements of each lens group of the projection zoom lens when changing magnification from the wide angle end to the telephoto end are the same as those of Example 3 described above. Basic lens data are shown in Table 10, aspherical surface coefficients are shown in Table 11, and the values of various items and the variable distances between surfaces are shown in Table 12 for the projection zoom lens of Example 4. The spherical aberration, the astigmatism, the distortion, the lateral chromatic aberration of the projection zoom lens of Example 4 for a case in which the projection distance is 2300 are illustrated in aberration diagrams in order from the left to the right of FIG. 12.

TABLE 10

Example 4

| Si | Ri | Di | Ndj | vdj |
|---|---|---|---|---|
| *1 | −51.473 | 6.91 | 1.49100 | 57.56 |
| *2 | −364.124 | 0.99 | | |
| *3 | 90.990 | 5.76 | 1.49100 | 57.56 |
| *4 | 97.838 | 16.19 | | |
| 5 | 1006.495 | 2.62 | 1.79952 | 42.22 |
| 6 | 28.321 | DD[6] | | |
| 7 | −85.200 | 2.62 | 1.60311 | 60.64 |
| 8 | 98.071 | 7.85 | | |
| 9 | −160.085 | 2.10 | 1.58913 | 61.14 |
| 10 | 56.118 | 9.76 | 1.51823 | 58.90 |
| 11 | −130.056 | DD[11] | | |
| 12 | 90.048 | 8.38 | 1.80400 | 46.58 |
| 13 | −111.405 | DD[13] | | |
| 14 | 88.551 | 5.24 | 1.64769 | 33.79 |

TABLE 10-continued

Example 4

| Si | Ri | Di | Ndj | vdj |
|---|---|---|---|---|
| 15 | −3657.977 | 3.12 | | |
| 16 | −74.580 | 1.57 | 1.72000 | 41.98 |
| 17 | −484.105 | DD[17] | | |
| 18 | 53.058 | 4.72 | 1.49700 | 81.54 |
| 19 | −578.207 | DD[19] | | |
| *20 | 64.603 | 2.14 | 1.80139 | 45.45 |
| *21 | 25.779 | 2.04 | | |
| 22 | 38.791 | 9.98 | 1.49700 | 81.54 |
| 23 | −15.962 | 2.10 | 1.80400 | 46.58 |
| 24 | −73.070 | 1.05 | | |
| 25 | −77.080 | 2.63 | 1.80610 | 40.92 |
| 26 | 42.638 | 6.64 | 1.49700 | 81.54 |
| 27 | −52.052 | 0.45 | | |
| 28 | 98.893 | 8.38 | 1.49700 | 81.54 |
| 29 | −32.873 | DD[29] | | |
| 30 | 102.241 | 6.28 | 1.58913 | 61.14 |
| 31 | −85.197 | 10.63 | | |
| 32 | ∞ | 36.66 | 1.51633 | 64.14 |
| 33 | ∞ | | | |

TABLE 11

Example 4

| | Surface Number | | | |
|---|---|---|---|---|
| | 1 | 2 | 3 | 4 |
| KA | −1.5788085E+00 | 3.8241651E+01 | 2.9403772E+00 | −9.0358134E+00 |
| A3 | −3.7908092E−17 | 7.8715209E−18 | 9.2608239E−20 | −7.9983849E−20 |
| A4 | 1.3385121E−05 | 1.1690013E−05 | 9.5503406E−06 | 1.7703753E−05 |
| A5 | 2.0294438E−06 | 1.6252750E−06 | 1.0586224E−06 | 8.4788108E−07 |
| A6 | −2.2821554E−07 | −1.0799891E−07 | −8.6400372E−08 | −1.2464529E−07 |
| A7 | 1.0203636E−08 | 1.7627330E−09 | −1.3746911E−09 | −2.0240557E−09 |
| A8 | −2.5051835E−10 | −2.4591751E−11 | 1.9017350E−10 | 4.4101474E−10 |
| A9 | 3.1507954E−12 | 2.0697909E−12 | −3.1569690E−13 | −1.9502578E−12 |
| A10 | 3.5181873E−16 | −5.5264322E−14 | −1.9497158E−13 | −7.1333088E−13 |
| A11 | −7.3306154E−16 | −7.4042037E−17 | 1.8895695E−15 | 1.0333916E−14 |
| A12 | 1.3337439E−17 | 1.8845627E−17 | 1.0417912E−16 | 5.8608071E−16 |
| A13 | −1.2674202E−19 | −9.1310019E−20 | −1.5142925E−18 | −1.1864215E−17 |
| A14 | 6.6761992E−22 | −3.5993600E−21 | −2.8128666E−20 | −2.3957875E−19 |
| A15 | −2.1608122E−25 | 2.9973181E−23 | 5.0399618E−22 | 5.6996486E−21 |
| A16 | −2.9702118E−26 | 3.1362766E−25 | 3.0368009E−24 | 3.8746625E−23 |
| A17 | 1.8148001E−28 | −3.3946983E−27 | −6.2144585E−26 | −1.0099483E−24 |

| | Surface Number | |
|---|---|---|
| | 20 | 21 |
| KA | 1.0000000E+00 | 1.0000000E+00 |
| A4 | −2.5808895E−06 | −5.7597999E−06 |
| A6 | −4.7626487E−09 | −2.0538315E−08 |
| A8 | 1.5241956E−10 | 1.3897772E−10 |
| A10 | −3.0007334E−14 | 2.5449333E−14 |
| A12 | −5.9587736E−16 | −8.5087601E−16 |
| A14 | −1.1314014E−21 | −1.3464629E−18 |
| A16 | 5.1335295E−25 | 3.6856430E−26 |
| A18 | 1.9543992E−30 | −5.3037352E−30 |

TABLE 12

Example 4

|  | Projection Distance = ∞ | | Projection Distance = 2300 | |
| --- | --- | --- | --- | --- |
|  | WIDE | TELE | WIDE | TELE |
| Zr | 1.0 | 1.25 | 1.0 | 1.25 |
| f | 10.00 | 12.50 |  |  |
| Bf | 34.80 | 34.80 |  |  |
| FNo. | 1.90 | 2.05 | 1.90 | 2.05 |
| 2ω [°] | 108.2 | 95.4 | 107.0 | 94.0 |
| DD[6] | 26.08 | 26.08 | 22.99 | 22.99 |
| DD[11] | 16.85 | 7.92 | 17.97 | 9.04 |
| DD[13] | 15.69 | 22.93 | 15.69 | 22.93 |
| DD[17] | 22.29 | 2.41 | 22.29 | 2.41 |
| DD[19] | 10.86 | 23.70 | 10.86 | 23.70 |
| DD[29] | 0.31 | 9.04 | 0.31 | 9.04 |

Example 5

The lens configuration of the projection zoom lens of Example 5 is illustrated in FIG. 5. In the projection zoom lens of Example 5, the movements of each lens group of the projection zoom lens when changing magnification from the wide angle end to the telephoto end are the same as those of Example 1 illustrated in FIG. 1. Basic lens data are shown in Table 13, aspherical surface coefficients are shown in Table 14, and the values of various items and the variable distances between surfaces are shown in Table 15 for the projection zoom lens of Example 5. The spherical aberration, the astigmatism, the distortion, the lateral chromatic aberration of the projection zoom lens of Example 5 for a case in which the projection distance is 2300 are illustrated in aberration diagrams in order from the left to the right of FIG. 13.

TABLE 13

Example 5

| Si | Ri | Di | Ndj | vdj |
| --- | --- | --- | --- | --- |
| *1 | −49.306 | 6.88 | 1.49100 | 57.56 |
| *2 | −377.175 | 0.31 |  |  |
| *3 | 93.173 | 5.73 | 1.49100 | 57.56 |
| *4 | 97.503 | 15.35 |  |  |
| 5 | 758.882 | 2.60 | 1.80610 | 40.92 |
| 6 | 28.573 | DD[6] |  |  |
| 7 | −89.139 | 3.21 | 1.60311 | 60.64 |
| 8 | 98.177 | 7.32 |  |  |
| 9 | −148.344 | 2.39 | 1.58913 | 61.14 |
| 10 | 53.418 | 9.72 | 1.51742 | 52.43 |
| 11 | −128.522 | DD[11] |  |  |
| 12 | 89.485 | 8.91 | 1.80400 | 46.58 |
| 13 | −110.313 | DD[13] |  |  |
| 14 | 85.877 | 5.23 | 1.63980 | 34.46 |
| 15 | 20531.581 | 3.30 |  |  |
| 16 | −74.032 | 1.99 | 1.72000 | 41.98 |
| 17 | −591.012 | DD[17] |  |  |
| 18 | 49.297 | 4.75 | 1.49700 | 81.54 |
| 19 | −652.466 | DD[19] |  |  |
| *20 | 64.553 | 1.89 | 1.80139 | 45.45 |
| *21 | 25.503 | 1.58 |  |  |
| 22 | 39.317 | 11.37 | 1.49700 | 81.54 |
| 23 | −15.637 | 2.08 | 1.80400 | 46.58 |
| 24 | −76.937 | 1.04 |  |  |
| 25 | −83.901 | 2.61 | 1.80610 | 40.92 |
| 26 | 42.557 | 6.32 | 1.49700 | 81.54 |
| 27 | −52.884 | 0.31 |  |  |
| 28 | 98.544 | 8.70 | 1.49700 | 81.54 |
| 29 | −32.310 | DD[29] |  |  |
| 30 | 99.851 | 6.25 | 1.58913 | 61.14 |
| 31 | −81.455 | 10.57 |  |  |
| 32 | ∞ | 36.46 | 1.51633 | 64.14 |
| 33 | ∞ |  |  |  |

TABLE 14

Example 5

| | Surface Number | | | |
| --- | --- | --- | --- | --- |
|  | 1 | 2 | 3 | 4 |
| KA | −3.4711432E+00 | 3.8187655E+01 | 3.0605228E+00 | −9.9561112E+00 |
| A3 | 2.5764711E−18 | 1.4000753E−17 | 0.0000000E+00 | −1.5485667E−19 |
| A4 | 1.6092867E−05 | 1.4739662E−05 | 9.3509256E−06 | 1.8812117E−05 |
| A5 | 1.8633803E−06 | 1.6999016E−06 | 9.6450533E−07 | 5.6933513E−07 |
| A6 | −2.2858461E−07 | −1.0877226E−07 | −8.8982689E−08 | −1.4040920E−07 |
| A7 | 1.0314678E−08 | 7.8975403E−10 | −1.2177178E−09 | −1.2034138E−10 |
| A8 | −2.4756844E−10 | 1.3170157E−11 | 1.9432240E−10 | 4.6362327E−10 |
| A9 | 2.9714934E−12 | 1.9756114E−12 | −2.8258722E−13 | −6.4651273E−12 |
| A10 | 7.2288820E−16 | −6.5456182E−14 | −1.9657534E−13 | −7.0571657E−13 |
| A11 | −6.6504659E−16 | −1.5050964E−16 | 1.6622432E−15 | 1.5897365E−14 |
| A12 | 1.2946853E−17 | 2.3232216E−17 | 1.0352206E−16 | 5.5252166E−16 |
| A13 | −1.3945295E−19 | −7.5436428E−20 | −1.3247801E−18 | −1.5574958E−17 |
| A14 | 7.0543715E−22 | −4.4377295E−21 | −2.7532322E−20 | −2.1744443E−19 |
| A15 | 1.7276031E−24 | 2.8727780E−23 | 4.3866477E−22 | 6.9511255E−21 |
| A16 | −3.2715219E−26 | 3.6201454E−25 | 2.9263430E−24 | 3.4115455E−23 |
| A17 | 6.3199645E−29 | −3.1738127E−27 | −5.3818255E−26 | −1.1750605E−24 |

| | Surface Number | |
| --- | --- | --- |
|  | 20 | 21 |
| KA | 1.0000000E+00 | 1.0000000E+00 |
| A4 | −2.6293345E−06 | −5.8321203E−06 |
| A6 | −4.9793148E−09 | −2.1078770E−08 |
| A8 | 1.5876122E−10 | 1.4399104E−10 |
| A10 | −3.1579186E−14 | 2.6698530E−14 |
| A12 | −6.2988774E−16 | −9.0001074E−16 |
| A14 | 3.5257466E−20 | −1.5440358E−18 |

TABLE 14-continued

| | Example 5 | |
|---|---|---|
| A16 | 5.5636747E−25 | 3.8230243E−26 |
| A18 | 2.1410084E−30 | −5.8101444E−30 |

TABLE 15

| | Example 5 | | | |
|---|---|---|---|---|
| | Projection Distance = ∞ | | Projection Distance = 2300 | |
| | WIDE | TELE | WIDE | TELE |
| Zr | 1.0 | 1.25 | 1.0 | 1.25 |
| f | 10.00 | 12.50 | | |
| Bf | 34.62 | 34.62 | | |
| FNo. | 1.90 | 2.06 | 1.90 | 2.06 |
| 2ω [°] | 107.8 | 95.2 | 106.8 | 94.0 |
| DD[6] | 25.07 | 25.07 | 22.73 | 22.73 |
| DD[11] | 16.52 | 7.95 | 17.39 | 8.82 |
| DD[13] | 15.42 | 21.88 | 15.42 | 21.88 |
| DD[17] | 21.19 | 2.39 | 21.19 | 2.39 |
| DD[19] | 11.27 | 22.82 | 11.27 | 22.82 |
| DD[29] | 0.35 | 9.71 | 0.35 | 9.71 |

Example 6

The lens configuration of the projection zoom lens of Example 6 is illustrated in FIG. 6. In the projection zoom lens of Example 6, the movements of each lens group of the projection zoom lens when changing magnification from the wide angle end to the telephoto end are the same as those of Example 1 illustrated in FIG. 1. Basic lens data are shown in Table 16, aspherical surface coefficients are shown in Table 17, and the values of various items and the variable distances between surfaces are shown in Table 18 for the projection zoom lens of Example 6. The spherical aberration, the astigmatism, the distortion, the lateral chromatic aberration of the projection zoom lens of Example 6 for a case in which the projection distance is 2300 are illustrated in aberration diagrams in order from the left to the right of FIG. 14.

TABLE 16

| | Example 6 | | | |
|---|---|---|---|---|
| Si | Ri | Di | Ndj | νdj |
| *1 | −48.127 | 6.87 | 1.51007 | 56.24 |
| *2 | −357.511 | 0.31 | | |
| *3 | 99.068 | 5.73 | 1.51007 | 56.24 |
| *4 | 104.918 | 15.51 | | |
| 5 | 766.372 | 2.60 | 1.80610 | 40.92 |
| 6 | 28.813 | DD[6] | | |
| 7 | −89.074 | 3.24 | 1.61104 | 60.73 |
| 8 | 103.240 | 7.81 | | |
| 9 | −153.133 | 2.61 | 1.58698 | 61.65 |
| 10 | 54.213 | 9.88 | 1.51742 | 52.43 |
| 11 | −114.963 | DD[11] | | |
| 12 | 89.690 | 8.33 | 1.80400 | 46.58 |
| 13 | −111.322 | DD[13] | | |
| 14 | 86.888 | 5.52 | 1.59270 | 35.31 |
| 15 | −3116.030 | 1.99 | | |
| 16 | −76.741 | 1.61 | 1.73041 | 43.91 |
| 17 | −627.376 | DD[17] | | |
| 18 | 47.832 | 4.69 | 1.49700 | 81.54 |
| 19 | −1155.823 | DD[19] | | |
| *20 | 62.617 | 1.91 | 1.80139 | 45.45 |
| *21 | 25.550 | 1.56 | | |
| 22 | 40.245 | 11.54 | 1.49700 | 81.54 |
| 23 | −15.615 | 2.08 | 1.80400 | 46.58 |
| 24 | −79.778 | 1.09 | | |
| 25 | −89.371 | 2.61 | 1.80610 | 40.92 |
| 26 | 43.611 | 6.25 | 1.49700 | 81.54 |
| 27 | −55.149 | 0.31 | | |
| 28 | 104.013 | 8.33 | 1.49700 | 81.54 |
| 29 | −32.424 | DD[29] | | |
| 30 | 99.672 | 6.25 | 1.58596 | 61.60 |
| 31 | −76.968 | 10.56 | | |
| 32 | ∞ | 36.44 | 1.51633 | 64.14 |
| 33 | ∞ | | | |

TABLE 17

| | Example 6 | | | |
|---|---|---|---|---|
| | Surface Number | | | |
| | 1 | 2 | 3 | 4 |
| KA | −5.7748532E+00 | 4.0030222E+01 | 1.5783416E+00 | −1.1296999E+01 |
| A3 | −1.8322705E−17 | −2.3783935E−18 | 8.5949596E−20 | 0.0000000E+00 |
| A4 | 1.2059863E−05 | 2.7300228E−05 | 2.5877695E−05 | 2.2321497E−05 |
| A5 | 2.1518286E−06 | 8.4659426E−07 | 4.7591191E−07 | 9.7779369E−07 |
| A6 | −2.4333625E−07 | −9.7425393E−08 | −1.4140458E−07 | −1.8027660E−07 |
| A7 | 1.0861450E−08 | 9.3444082E−10 | 1.7761274E−09 | −5.1867668E−10 |
| A8 | −2.6144817E−10 | 4.5338660E−11 | 2.1069254E−10 | 5.5880453E−10 |
| A9 | 3.2671597E−12 | 1.5992718E−13 | −4.5170392E−12 | −7.0572641E−12 |
| A10 | −3.3090866E−15 | −4.6594435E−14 | −1.6224247E−13 | −8.1619680E−13 |
| A11 | −7.1507172E−16 | 3.5341163E−16 | 4.6362705E−15 | 1.6607995E−14 |
| A12 | 1.5824141E−17 | 1.3835312E−17 | 7.0115155E−17 | 6.2073444E−16 |
| A13 | −1.7059592E−19 | −1.5156299E−19 | −2.4931395E−18 | −1.5200462E−17 |
| A14 | 6.0812988E−22 | −2.1620143E−21 | −1.6115119E−20 | −2.3879300E−19 |
| A15 | 4.2875601E−24 | 2.7788901E−23 | 6.8726588E−22 | 6.3379461E−21 |
| A16 | −2.5885907E−26 | 1.4033469E−25 | 1.5383995E−24 | 3.6746064E−23 |
| A17 | −7.5847582E−29 | −1.9688670E−27 | −7.6264090E−26 | −1.0036214E−24 |

TABLE 17-continued

Example 6

| | Surface Number | |
|---|---|---|
| | 20 | 21 |
| KA | 1.0000000E+00 | 1.0000000E+00 |
| A4 | −2.6335122E−06 | −5.8413870E−06 |
| A6 | −4.9925079E−09 | −2.1134619E−08 |
| A8 | 1.5935044E−10 | 1.4452544E−10 |
| A10 | −3.1729954E−14 | 2.6825997E−14 |
| A12 | −6.3356523E−16 | −9.0526529E−16 |
| A14 | 3.5500866E−20 | −1.5546950E−18 |
| A16 | 5.6080160E−25 | 3.8534930E−26 |
| A18 | 2.1603571E−30 | −5.8626518E−30 |

TABLE 18

Example 6

| | Projection Distance = ∞ | | Projection Distance = 2300 | |
|---|---|---|---|---|
| | WIDE | TELE | WIDE | TELE |
| Zr | 1.0 | 1.25 | 1.0 | 1.25 |
| f | 10.00 | 12.50 | | |
| Bf | 34.60 | 34.60 | | |
| FNo. | 1.91 | 2.06 | 1.91 | 2.06 |
| 2ω [°] | 108.0 | 95.0 | 106.8 | 93.8 |
| DD[6] | 23.96 | 23.96 | 21.43 | 21.43 |
| DD[11] | 16.57 | 7.77 | 17.59 | 8.79 |
| DD[13] | 16.00 | 23.21 | 16.00 | 23.21 |
| DD[17] | 23.28 | 4.39 | 23.28 | 4.39 |
| DD[19] | 10.81 | 22.24 | 10.81 | 22.24 |
| DD[29] | 0.31 | 9.36 | 0.31 | 9.36 |

Example 7

The lens configuration of the projection zoom lens of Example 7 is illustrated in FIG. 7. In the projection zoom lens of Example 7, the movements of each lens group of the projection zoom lens when changing magnification from the wide angle end to the telephoto end are the same as those of Example 1 illustrated in FIG. 1. Basic lens data are shown in Table 19, aspherical surface coefficients are shown in Table 20, and the values of various items and the variable distances between surfaces are shown in Table 21 for the projection zoom lens of Example 7. The spherical aberration, the astigmatism, the distortion, the lateral chromatic aberration of the projection zoom lens of Example 7 for a case in which the projection distance is 2300 are illustrated in aberration diagrams in order from the left to the right of FIG. 15.

TABLE 19

Example 7

| Si | Ri | Di | Ndj | vdj |
|---|---|---|---|---|
| *1 | −47.797 | 6.88 | 1.51007 | 56.24 |
| *2 | −360.779 | 0.31 | | |
| *3 | 98.997 | 5.73 | 1.51007 | 56.24 |
| *4 | 104.994 | 15.66 | | |
| 5 | 821.238 | 2.60 | 1.80610 | 40.92 |
| 6 | 29.015 | DD[6] | | |
| 7 | −91.499 | 2.60 | 1.62041 | 60.29 |
| 8 | 105.174 | 7.81 | | |
| 9 | −144.634 | 2.62 | 1.58913 | 61.14 |
| 10 | 54.268 | 9.46 | 1.51742 | 52.43 |
| 11 | −107.967 | DD[11] | | |
| 12 | 89.308 | 8.33 | 1.80400 | 46.58 |
| 13 | −113.189 | DD[13] | | |
| 14 | 85.175 | 5.21 | 1.59270 | 35.31 |
| 15 | −4004.111 | 1.93 | | |
| 16 | −77.111 | 1.56 | 1.72000 | 43.69 |
| 17 | −763.167 | DD[17] | | |
| 18 | 48.387 | 4.70 | 1.49700 | 81.54 |
| 19 | −1185.853 | DD[19] | | |
| *20 | 62.554 | 1.83 | 1.80139 | 45.45 |
| *21 | 25.602 | 1.56 | | |
| 22 | 40.475 | 11.80 | 1.49700 | 81.54 |
| 23 | −15.614 | 2.08 | 1.80400 | 46.58 |
| 24 | −79.594 | 1.04 | | |
| 25 | −90.122 | 2.61 | 1.80610 | 40.92 |
| 26 | 43.626 | 6.23 | 1.49700 | 81.54 |
| 27 | −56.219 | 0.31 | | |
| 28 | 104.432 | 8.34 | 1.49700 | 81.54 |
| 29 | −32.187 | DD[29] | | |
| 30 | 99.072 | 6.25 | 1.58913 | 61.14 |
| 31 | −78.333 | 10.57 | | |
| 32 | ∞ | 36.46 | 1.51633 | 64.14 |
| 33 | ∞ | | | |

TABLE 20

Example 7

| | Surface Number | | | |
|---|---|---|---|---|
| | 1 | 2 | 3 | 4 |
| KA | −5.7205050E+00 | 3.7739019E+01 | 1.5871939E+00 | −1.0465661E+01 |
| A3 | −2.2347568E−05 | −4.1667529E−06 | 1.1475538E−05 | −2.5375929E−04 |
| A4 | 2.1054821E−05 | 2.9685108E−05 | 2.1164200E−05 | 1.7436215E−04 |
| A5 | 6.2845174E−07 | 3.0180641E−07 | 1.4035884E−06 | −3.5682597E−05 |
| A6 | −1.0187189E−07 | −3.0286543E−08 | −2.3587466E−07 | 4.4677624E−06 |
| A7 | 2.8922009E−09 | −4.1555912E−09 | 6.8234213E−09 | −3.2899745E−07 |
| A8 | 1.6275591E−11 | 2.9200302E−10 | 1.1049335E−10 | 1.2159487E−08 |
| A9 | −2.2565796E−12 | −7.2815306E−12 | −7.5709583E−12 | −4.2273442E−11 |

TABLE 20-continued

Example 7

| | | | | |
|---|---|---|---|---|
| A10 | 3.0239471E−14 | 7.3722311E−14 | 3.7470335E−14 | −1.2881328E−11 |
| A11 | 4.5327805E−16 | 7.8287202E−17 | 2.1864546E−15 | 3.2621063E−13 |
| A12 | −1.6571037E−17 | −5.1536344E−18 | 2.5004557E−17 | 4.8745824E−15 |
| A13 | 1.3969696E−19 | −2.7874837E−19 | −2.9115615E−18 | −2.9521250E−16 |
| A14 | 7.7664480E−22 | 1.4596603E−20 | 9.1247551E−20 | 1.0819246E−18 |
| A15 | −2.5424484E−23 | −3.0470883E−22 | −2.3067199E−21 | 1.2894984E−19 |
| A16 | 2.1867047E−25 | 3.0558221E−24 | 3.6632084E−23 | −2.5202379E−21 |
| A17 | −7.4379656E−28 | −1.2008797E−26 | −2.3328289E−25 | 1.4876960E−23 |

| | Surface Number | |
|---|---|---|
| | 20 | 21 |
| KA  | 1.0000000E+00  | 1.0000000E+00 |
| A4  | −2.6283420E−06 | −5.8299188E−06 |
| A6  | −4.9761826E−09 | −2.1065510E−08 |
| A8  | 1.5862142E−10  | 1.4386424E−10 |
| A10 | −3.1543438E−14 | 2.6668307E−14 |
| A12 | −6.2901635E−16 | −8.9876567E−16 |
| A14 | 3.5199830E−20  | −1.5415117E−18 |
| A16 | 5.5531817E−25  | 3.8158141E−26 |
| A18 | 2.1364327E−30  | −5.7977270E−30 |

TABLE 21

Example 7

| | Projection Distance = ∞ | | Projection Distance = 2300 | |
|---|---|---|---|---|
| | WIDE | TELE | WIDE | TELE |
| Zr | 1.0 | 1.25 | 1.0 | 1.25 |
| f | 10.00 | 12.50 | | |
| Bf | 34.62 | 34.62 | | |
| FNo. | 1.91 | 2.06 | 1.91 | 2.06 |
| 2ω [°] | 108.0 | 95.0 | 106.8 | 93.8 |
| DD[6] | 23.62 | 23.62 | 20.93 | 20.93 |
| DD[11] | 17.90 | 8.85 | 19.00 | 9.95 |
| DD[13] | 16.41 | 23.55 | 16.41 | 23.55 |
| DD[17] | 23.59 | 4.88 | 23.59 | 4.88 |
| DD[19] | 10.50 | 22.12 | 10.50 | 22.12 |
| DD[29] | 0.31 | 9.31 | 0.31 | 9.31 |

Example 8

Figure 16:
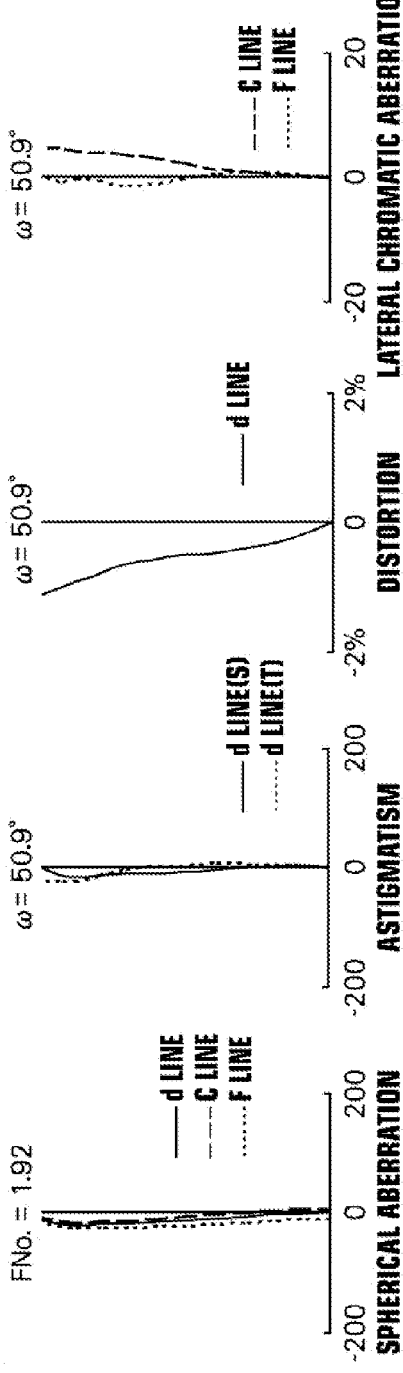
FIG. 16 is a collection of diagrams that illustrate aberrations of the projection zoom lens according to Example 8, the diagrams illustrating spherical aberration, astigmatism, distortion, and lateral chromatic aberrations in this order from the left side of the drawing sheet.

The lens configuration of the projection zoom lens of Example 8 is illustrated in FIG. 8. In the projection zoom lens of Example 8, the movements of each lens group of the projection zoom lens when changing magnification from the wide angle end to the telephoto end are the same as those of Example 1 illustrated in FIG. 1. Basic lens data are shown in Table 22, aspherical surface coefficients are shown in Table 23, and the values of various items and the variable distances between surfaces are shown in Table 24 for the projection zoom lens of Example 8. The spherical aberration, the astigmatism, the distortion, the lateral chromatic aberration of the projection zoom lens of Example 8 for a case in which the projection distance is 2300 are illustrated in aberration diagrams in order from the left to the right of FIG. 16.

TABLE 22

Example 8

| Si | Ri | Di | Ndj | νdj |
|---|---|---|---|---|
| *1 | −44.115 | 6.39 | 1.49100 | 57.56 |
| *2 | −289.776 | 2.45 | | |
| *3 | 87.814 | 5.40 | 1.49100 | 57.56 |
| *4 | 97.035 | 12.08 | | |
| 5 | 1139.310 | 2.46 | 1.79952 | 42.22 |
| 6 | 26.717 | DD[6] | | |
| 7 | −77.907 | 3.59 | 1.58913 | 61.13 |
| 8 | 70.317 | 6.99 | | |
| 9 | 507.225 | 8.95 | 1.56732 | 42.82 |
| 10 | −47.788 | 2.33 | 1.58913 | 61.13 |
| 11 | −37035.054 | DD[11] | | |
| 12 | 86.907 | 8.16 | 1.80400 | 46.58 |
| 13 | −104.088 | DD[13] | | |
| 14 | 87.370 | 5.09 | 1.80610 | 33.27 |
| 15 | 1696.701 | 3.82 | | |
| 16 | −65.881 | 1.47 | 1.80100 | 34.97 |
| 17 | −332.960 | DD[17] | | |
| 18 | 47.446 | 5.73 | 1.49700 | 81.54 |
| 19 | −199.871 | DD[19] | | |
| *20 | 56.588 | 1.73 | 1.80610 | 40.93 |
| *21 | 24.298 | 1.58 | | |
| 22 | 34.032 | 10.79 | 1.49700 | 81.54 |
| 23 | −15.277 | 1.96 | 1.80400 | 46.58 |
| 24 | −78.838 | 0.98 | | |
| 25 | −82.313 | 2.56 | 1.80400 | 46.58 |
| 26 | 40.945 | 6.28 | 1.49700 | 81.54 |
| 27 | −44.576 | 0.29 | | |
| 28 | 82.655 | 8.76 | 1.49700 | 81.54 |
| 29 | −34.833 | DD[29] | | |
| 30 | 238.184 | 5.89 | 1.57099 | 50.80 |
| 31 | −65.101 | 17.30 | | |
| 32 | ∞ | 24.56 | 1.51633 | 64.14 |
| 33 | ∞ | | | |

TABLE 23

Example 8

| | Surface Number | | | |
|---|---|---|---|---|
| | 1 | 2 | 3 | 4 |
| KA | −1.1386138E+00 | 2.0105506E+01 | 3.8679534E+00 | 5.6811732E+00 |
| A3 | 1.5787236E−17 | 9.6026427E−18 | 0.0000000E+00 | 6.9350545E−20 |
| A4 | 2.1795372E−05 | 3.7840197E−05 | 2.9625820E−05 | 2.0498430E−05 |
| A5 | 4.1616684E−06 | 4.4618104E−06 | 3.7095851E−06 | 2.0205124E−06 |
| A6 | −5.3634947E−07 | −4.4225100E−07 | −3.0302682E−07 | −1.6694176E−07 |
| A7 | 2.7512914E−08 | 8.9136052E−09 | −1.1566986E−08 | −1.3315496E−08 |
| A8 | −7.9154444E−10 | −9.3816195E−11 | 9.9035287E−10 | 9.6296953E−10 |
| A9 | 1.2655301E−11 | 1.5294993E−11 | 1.1285323E−11 | 2.7089410E−11 |
| A10 | −2.9133205E−14 | −5.7144337E−13 | −1.5931024E−12 | −2.4270243E−12 |
| A11 | −4.1010650E−15 | −6.7935265E−16 | 2.9189529E−15 | −1.8722421E−14 |
| A12 | 1.0384394E−16 | 2.9860567E−16 | 1.3606660E−15 | 3.0204589E−15 |
| A13 | −1.0082092E−18 | −1.6336686E−18 | −1.2669203E−17 | −4.1536775E−18 |
| A14 | 2.5845927E−22 | −8.6962100E−20 | −5.9062919E−19 | −1.8475269E−18 |
| A15 | 4.0739120E−23 | 7.8627258E−22 | 8.2196738E−21 | 1.0396130E−20 |
| A16 | 2.6762094E−25 | 1.1757168E−23 | 1.0252433E−22 | 4.4601992E−22 |
| A17 | −3.9718364E−27 | −1.3855471E−25 | −1.7365140E−24 | −3.3391728E−24 |

| | Surface Number | |
|---|---|---|
| | 20 | 21 |
| KA | 1.0000000E+00 | 1.0000000E+00 |
| A4 | −3.1279278E−06 | −6.9806314E−06 |
| A6 | −6.5613630E−09 | −2.8295041E−08 |
| A8 | 2.3869561E−10 | 2.1764511E−10 |
| A10 | −5.3418211E−14 | 4.5304186E−14 |
| A12 | −1.2058048E−15 | −1.7218147E−15 |
| A14 | −2.6025259E−21 | −3.0972248E−18 |
| A16 | 1.3423093E−24 | 9.6371765E−26 |
| A18 | 5.8090890E−30 | −1.5764369E−29 |

TABLE 24

Example 8

| | Projection Distance = ∞ | | Projection Distance = 2300 | |
|---|---|---|---|---|
| | WIDE | TELE | WIDE | TELE |
| Zr | 1.0 | 1.25 | 1.0 | 1.25 |
| f | 10.00 | 12.50 | | |
| Bf | 33.50 | 33.50 | | |
| FNo. | 1.92 | 2.08 | 1.92 | 2.08 |
| 2ω [°] | 102.6 | 89.6 | 101.8 | 88.8 |
| DD[6] | 20.11 | 20.11 | 18.59 | 18.59 |
| DD[11] | 14.23 | 6.19 | 14.81 | 6.77 |
| DD[13] | 19.55 | 26.12 | 19.55 | 26.12 |
| DD[17] | 19.85 | 2.43 | 19.85 | 2.43 |
| DD[19] | 8.13 | 19.11 | 8.13 | 19.11 |
| DD[29] | 0.30 | 8.22 | 0.30 | 8.22 |

Table 25 shows values corresponding to Conditional Formulae (1) through (15) for Examples 1 through 8 above. Table 26 shows values related to each of the conditional formulae for Examples 1 through 8. The values shown in Table 25 and Table 26 are related to the d line. Paraxial amounts are employed as the position of the pupil at the magnification side of enP in Table 25 and Table 26.

TABLE 25

| | | Example 1 | Example 2 | Example 3 | Example 4 | Example 5 | Example 6 | Example 7 | Example 8 |
|---|---|---|---|---|---|---|---|---|---|
| (1) | |dn1/dt| | 120 × 10⁻⁶ | 120 × 10⁻⁶ | 120 × 10⁻⁶ | 120 × 10⁻⁶ | 120 × 10⁻⁶ | 100 × 10⁻⁶ | 100 × 10⁻⁶ | 120 × 10⁻⁶ |
| (2) | |dn2/dt| | 120 × 10⁻⁶ | 120 × 10⁻⁶ | 120 × 10⁻⁶ | 120 × 10⁻⁶ | 120 × 10⁻⁶ | 100 × 10⁻⁶ | 100 × 10⁻⁶ | 120 × 10⁻⁶ |
| (3) | fL3/fG1A | 1.476 | 1.470 | 1.505 | 1.483 | 1.512 | 1.546 | 1.554 | 1.502 |
| (4) | R1/H1 | −0.885 | −0.906 | −0.894 | −0.872 | −0.856 | −0.874 | −0.868 | −0.891 |
| (5) | enP/Bf | 1.006 | 0.974 | 1.082 | 1.091 | 1.054 | 1.039 | 1.038 | 1.006 |
| (6) | fL1a2/fw | −11.878 | −11.610 | −12.203 | −12.852 | −11.890 | −11.275 | −11.174 | −11.302 |
| (7) | H1/D4 | 4.253 | 4.507 | 3.822 | 3.645 | 3.750 | 3.549 | 3.517 | 4.099 |
| (8) | Imφ×enP / H1 × fw | 1.673 | 1.664 | 1.765 | 1.779 | 1.743 | 1.794 | 1.795 | 1.680 |
| (9) | fw/|fL1| + fw/|fL2| | 0.104 | 0.100 | 0.090 | 0.086 | 0.089 | 0.095 | 0.096 | 0.100 |
| (10) | L/Imφ | 7.983 | 7.530 | 7.908 | 7.653 | 7.625 | 7.626 | 7.628 | 7.983 |
| (11) | Bf/Imφ | 1.346 | 1.345 | 1.273 | 1.259 | 1.259 | 1.259 | 1.259 | 1.346 |
| (12) | Imφ/fw | 2.480 | 2.491 | 2.651 | 2.765 | 2.750 | 2.749 | 2.750 | 2.480 |

TABLE 25-continued

|  |  | Example 1 | Example 2 | Example 3 | Example 4 | Example 5 | Example 6 | Example 7 | Example 8 |
|---|---|---|---|---|---|---|---|---|---|
| (13) | fG2/fw | 5.980 | 5.580 | 6.492 | 6.311 | 6.270 | 6.294 | 6.325 | 5.980 |
| (14) | fG5a6/fw | 4.490 | 4.170 | 4.720 | 4.289 | 4.240 | 4.262 | 4.264 | 4.505 |
| (15) | FNo. max | 2.13 | 2.09 | 2.03 | 2.05 | 2.06 | 2.06 | 2.06 | 2.08 |

TABLE 26

|  | Example 1 | Example 2 | Example 3 | Example 4 | Example 5 | Example 6 | Example 7 | Example 8 |
|---|---|---|---|---|---|---|---|---|
| fw | 10.00 | 10.00 | 10.00 | 10.00 | 10.00 | 10.00 | 10.00 | 10.00 |
| fL1 | −106.972 | −108.364 | −117.095 | −122.989 | −116.324 | −109.856 | −108.825 | −106.896 |
| fL2 | 980.402 | 1360.945 | 2138.184 | 2073.247 | 2976.439 | 2617.751 | 2568.804 | 1577.667 |
| fL3 | −33.652 | −33.696 | −36.521 | −36.492 | −36.892 | −37.199 | −37.367 | −34.253 |
| fL1a2 | −118.78 | −116.10 | −122.033 | −128.519 | −118.90 | −112.75 | −111.74 | −113.02 |
| FG1A | −22.806 | −22.92 | −24.26 | −24.60 | −24.39 | −24.06 | −24.05 | −22.81 |
| fG2 | 59.803 | 55.801 | 64.923 | 63.106 | 62.698 | 62.942 | 63.250 | 59.803 |
| fG5a6 | 44.904 | 41.698 | 47.195 | 42.885 | 42.397 | 42.615 | 42.644 | 45.049 |
| R1 | −44.025 | −44.275 | −49.046 | −51.473 | −49.306 | −48.127 | −47.797 | −44.115 |
| D4 | 11.70 | 10.84 | 14.36 | 16.19 | 15.35 | 15.51 | 15.66 | 12.08 |
| enP | 33.57 | 32.64 | 36.521 | 37.952 | 36.486 | 35.942 | 35.946 | 33.570 |
| Bf | 33.37 | 33.503 | 33.759 | 34.801 | 34.615 | 34.596 | 34.619 | 33.365 |
| Imφ | 24.80 | 24.91 | 26.51 | 27.65 | 27.50 | 27.49 | 27.50 | 24.80 |
| L | 197.960 | 187.597 | 209.656 | 211.589 | 209.694 | 209.601 | 209.807 | 197.960 |
| H1 | 49.754 | 48.868 | 54.869 | 58.996 | 57.580 | 55.060 | 55.065 | 49.535 |

As can be understood from the data above, the projection zoom lenses of Examples 1 through 8 achieve cost reduction, realize a widening of the angle of view with a full angle of view within a range from 100° to 110° at the wide angle end, have a sufficiently long back focus such that prisms, etc. can be inserted, are configured such that the reduction sides thereof are telecentric, favorably correct various aberrations, and realize high optical performance.

Figure 17:
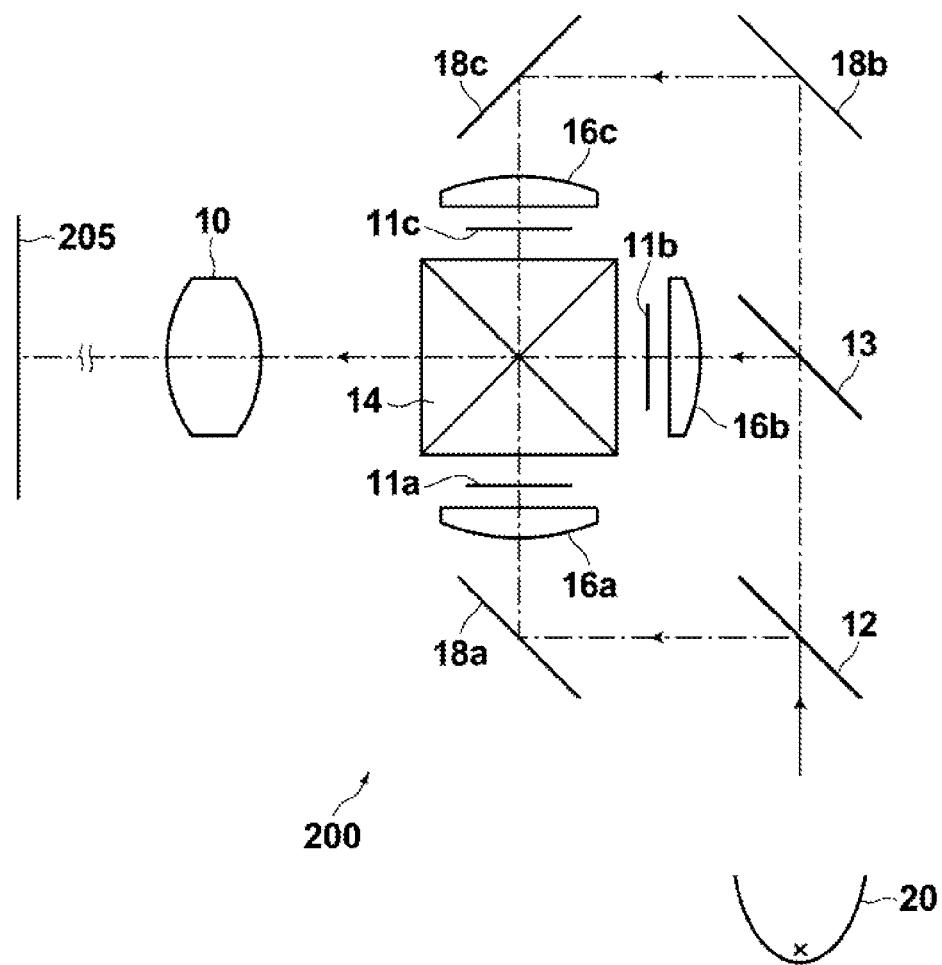
FIG. 17 is a diagram that illustrates the schematic configuration of a projection type display device according to an embodiment of the present disclosure.

Next, an embodiment of a projection display device of the present disclosure will be described with reference to FIG. 17. FIG. 17 is a diagram that illustrates the schematic configuration of a projection type display device according to an embodiment of the present disclosure. The projection type display device 200 illustrated in FIG. 17 is equipped with: a projection zoom lens 10 according to an embodiment of the present disclosure; a light source 20; transmissive display elements 11a through 11c that function as light valves each corresponding to a colored light beam; dichroic mirrors 12 and 13 for separating colors; a cross dichroic prism 14 for combining colors; condenser lenses 16a through 16c; and total reflection mirrors 18a through 18c for deflecting optical paths. Note that the projection zoom lens 10 is schematically illustrated in FIG. 17. In addition, although not illustrated in FIG. 17, an integrator is provided between the light source 20 and the dichroic mirror 12.

White light output by the light source 20 is separated into three colored light beams (G light, B light, and R light) by the dichroic mirrors 12 and 13. The colored light beams enters the transmissive display elements 11a through 11c corresponding thereto via the condenser lenses 16a through 16c and are optically modulated. After the colors are combined by the cross dichroic prism 14, the combined light beam enters the projection zoom lens 10. The projection zoom lens 10 projects an optical image formed by light which has been optically modulated by the transmissive display elements 11a through 11c onto a screen 205.

Embodiments and Examples of the present disclosure have been described above. However, the projection zoom lens of the present disclosure is not limited to the Examples described above, and various modifications to the aspects of the projection zoom lens are possible. For example, the radii of curvature, the distances among surfaces, the refractive indices, the Abbe's numbers, and the aspherical surface coefficients of the lenses may be changed as appropriate.

In addition, the projection type display device of the present disclosure is not limited to that having the configuration described above. For example, the light valves to be employed and the optical members to be employed to separate or combine light beams are not limited to those described above, and various modifications to these aspects are possible.

What is claimed is:

1. A projection zoom lens consisting of, in order from the magnification side to the reduction side:
    a first lens group having a negative refractive power, which is fixed when changing magnification;
    a second lens group having a positive refractive power, which moves when changing magnification;
    three third lens groups, which move when changing magnification; and
    a final lens group, which is fixed when changing magnification,
    wherein the distances among all adjacent lens groups change when changing magnification,
    the first lens group has a sub lens group consisting of a first lens, a second lens, and a third lens from the magnification side, the sub lens group having a negative refractive power,
    the first lens is a single lens having an aspherical surface with a concave surface toward the magnification side in the paraxial region and a negative refractive power in the paraxial region,
    the second lens is a single lens having an aspherical surface,
    the intersection between the surface of the first lens toward the magnification side and a principal light ray at a maximum angle of view is positioned more toward the reduction side than the intersection between the surface of the first lens toward the magnification side and the optical axis,
    the intersection between the surface of the first lens toward the reduction side and the principal light ray at the maximum angle of view is positioned more toward the reduction side than the intersection between the surface of the first lens toward the reduction side and the optical axis, the intersection between the surface of the second lens toward the magnification side and the principal light ray at the maximum angle of view is positioned more toward the reduction side than the intersection between the surface of the second lens toward the magnification side and the optical axis, the intersection between the surface of the second lens toward the reduction side and the principal light ray at the maximum angle of view is positioned more toward the reduction side than the intersection between the surface of the second lens toward the reduction side and the optical axis, and all of conditional formulae (1) through (3) below are satisfied:

$$30 \cdot 10^{-6} < |dn1/dt| \quad (1)$$

$$30 \cdot 10^{-6} < |dn2/dt| \quad (2)$$

$$1.0 < fL3/fG1A < 2.0 \quad (3),$$

and wherein dn1/dt is the temperature coefficient of the refractive index of the first lens with respect to the d line, dn2/dt is the temperature coefficient of the refractive index of the second lens with respect to the d line, fL3 is the focal length of the third lens, and fG1A is the focal length of first lens group front group.

2. The projection zoom lens as defined in claim 1, wherein conditional formula (4) below is satisfied:

$$-2.0 < R1/H1 < -0.5 \quad (4),$$

wherein R1 is the paraxial radius of curvature of the surface of the first lens toward the magnification side, and H1 is the height of a principal light ray at a maximum angle of view on the surface of the first lens toward the magnification side.

3. The projection zoom lens as defined in claim 1, wherein conditional formula (5) below is satisfied:

$$0.8 < enP/Bf < 1.5 \quad (5),$$

wherein enP is the distance from the lens surface most toward the magnification side to the position of a magnification side pupil along the optical axis, and Bf is an air converted length from the lens surface most toward the reduction side to a reduction side focal point position along the optical axis.

4. The projection zoom lens as defined in claim 1, wherein conditional formula (6) below is satisfied:

$$-20 < fL1a2/fw < -8 \quad (6),$$

wherein fL1a2 is the combined focal length of the first lens and the second lens, and fw is the focal length of the entire projection zoom lens at the wide angle end.

5. The projection zoom lens as defined in claim 1, wherein conditional formula (7) below is satisfied:

$$2.5 < H1/D4 < 6.0 \quad (7),$$

wherein H1 is the height of a principal light ray at a maximum angle of view on the surface of the first lens toward the magnification side, and D4 is the distance between the second lens and the third lens along the optical axis.

6. The projection zoom lens as defined in claim 1, wherein conditional formula (8) below is satisfied:

$$1.0 < (Im\phi \cdot enP)/(H1 \cdot fw) < 2.0 \quad (8),$$

wherein Im$\phi$ is the maximum effective image circle diameter at the reduction side, enP is the distance from the lens surface most toward the magnification side to the position of a magnification side pupil along the optical axis, H1 is the height of a principal light ray at a maximum angle of view on the surface of the first lens toward the magnification side, and fw is the focal length of the entire projection zoom lens at the wide angle end.

7. The projection zoom lens as defined in claim 1, wherein conditional formula (9) below is satisfied:

$$fw/|fL1| + fw/|fL2| < 0.15 \quad (9),$$

wherein fL1 is the focal length of the first lens, fL2 is the focal length of the second lens, and fw is the focal length of the entire projection zoom lens at the wide angle end.

8. The projection zoom lens as defined in claim 1, wherein conditional formula (10) below is satisfied:

$$L/Im\phi < 10 \quad (10),$$

wherein L is the distance from the lens surface most toward the magnification side to the reduction side focal point position along the optical axis in the case that the distance between the lens surface most toward the reduction side to the reduction side focal point position is an air converted distance, and Imp is the maximum effective image circle diameter at the reduction side.

9. The projection zoom lens as defined in claim 1, wherein conditional formula (11) below is satisfied:

$$1.0 < Bf/Im\phi < 2.0 \quad (11),$$

wherein Bf is an air converted length from the lens surface most toward the reduction side to a reduction side focal point position along the optical axis, and Imp is the maximum effective image circle diameter at the reduction side.

10. The projection zoom lens as defined in claim 1, wherein conditional formula (12) below is satisfied:

$$1.5 < Im\phi/fw < 4.0 \quad (12),$$

wherein Imp is the maximum effective image circle diameter at the reduction side, and fw is the focal length of the entire projection zoom lens at the wide angle end.

11. The projection zoom lens as defined in claim 1, wherein conditional formula (13) below is satisfied:

$$4.0 < fG2/fw < 8.0 \quad (13),$$

wherein fG2 is the focal length of the second lens group, and fw is the focal length of the entire projection zoom lens at the wide angle end.

12. The projection zoom lens as defined in claim 1, wherein conditional formula (14) below is satisfied:

$$3.0 < fG5a6/fw < 6.0 \quad (14),$$

wherein fG5a6 is the combined focal length of the lens group most toward the reduction side from among the plurality of third lens groups and the final lens group, and fw is the focal length of the entire projection zoom lens at the wide angle end.

13. The projection zoom lens as defined in claim 1, wherein:

the reduction side is telecentric.

14. A projection type display device, comprising:
a light source;
a light valve into which light from the light source enters; and
the projection zoom lens as defined in claim 1 as a projection zoom lens that projects an optical image formed by light modulated by the light valve onto a screen.

* * * * *